(12) United States Patent
Ishimoto et al.

(10) Patent No.: US 8,308,236 B2
(45) Date of Patent: Nov. 13, 2012

(54) VEHICULAR SEAT

(75) Inventors: Manabu Ishimoto, Chiryu (JP);
Keisuke Ishizaki, Nishio (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/866,661

(22) PCT Filed: Jun. 24, 2009

(86) PCT No.: PCT/JP2009/061524
§ 371 (c)(1),
(2), (4) Date: Aug. 6, 2010

(87) PCT Pub. No.: WO2010/150373
PCT Pub. Date: Dec. 29, 2010

(65) Prior Publication Data
US 2012/0086255 A1    Apr. 12, 2012

(51) Int. Cl.
*B60N 2/42* (2006.01)
*B60N 2/427* (2006.01)
*B60N 2/48* (2006.01)
*B60R 21/055* (2006.01)

(52) U.S. Cl. .................................. 297/216.12; 297/404

(58) Field of Classification Search ............ 297/216.12, 297/406, 407, 404
See application file for complete search history.

(56) References Cited

U.S. PATENT DOCUMENTS

| | | | | |
|---|---|---|---|---|
| 6,022,078 A * | 2/2000 | Chang | ...................... | 297/407 X |
| 6,478,377 B2 * | 11/2002 | Kassai et al. | ............... | 297/407 X |
| 6,890,028 B2 * | 5/2005 | Pal et al. | .................. | 297/216.12 |
| 7,264,313 B2 * | 9/2007 | Clough | .......................... | 297/407 |
| 7,597,394 B2 * | 10/2009 | Liu | ........................... | 297/407 X |
| 8,016,352 B2 * | 9/2011 | Liu | .......................... | 297/406 X |
| 8,066,329 B2 * | 11/2011 | Liu | ............................... | 297/407 |
| 2004/0195894 A1 * | 10/2004 | Pal et al. | ....................... | 297/406 |

FOREIGN PATENT DOCUMENTS

| | | |
|---|---|---|
| JP | A-63-013054 | 1/1988 |
| JP | A-2000-217660 | 8/2000 |
| JP | A-2000-287781 | 10/2000 |
| JP | A-2003-112545 | 4/2003 |
| JP | A-2007-161102 | 6/2007 |

OTHER PUBLICATIONS

International Search Report in International Application No. PCT/JP2009/061524; dated Oct. 13, 2009 (with English-language translation).

* cited by examiner

*Primary Examiner* — Rodney B White
(74) *Attorney, Agent, or Firm* — Oliff & Berridge, PLC

(57) ABSTRACT

A vehicular seat capable of effectively mitigating lateral direction vibrations is provided. In the present vehicular seat (10), a pair of leg portions (32A) of a headrest frame (32) are coupled to a seatback frame (20) to be relatively turnable about a longitudinal direction axis of a seatback (18). Joint portions 32C are provided between the pair of leg portions (32A) and a middle portion (32B) of the headrest frame (32). Thus, the headrest (14) is made turnable to left and right with respect to the seatback (18). Furthermore, the headrest (14) is urged toward a middle position of the range of turning with respect to the seatback (18) by rubber members that are provided between a headrest support (24) and a support bracket (20C). Thus, when lateral direction vibrations are applied to the present vehicular seat (10), the headrest (14) functions as a dynamic damper.

11 Claims, 26 Drawing Sheets

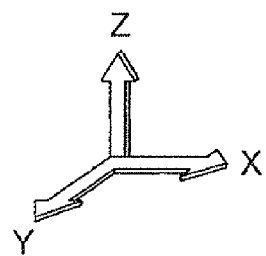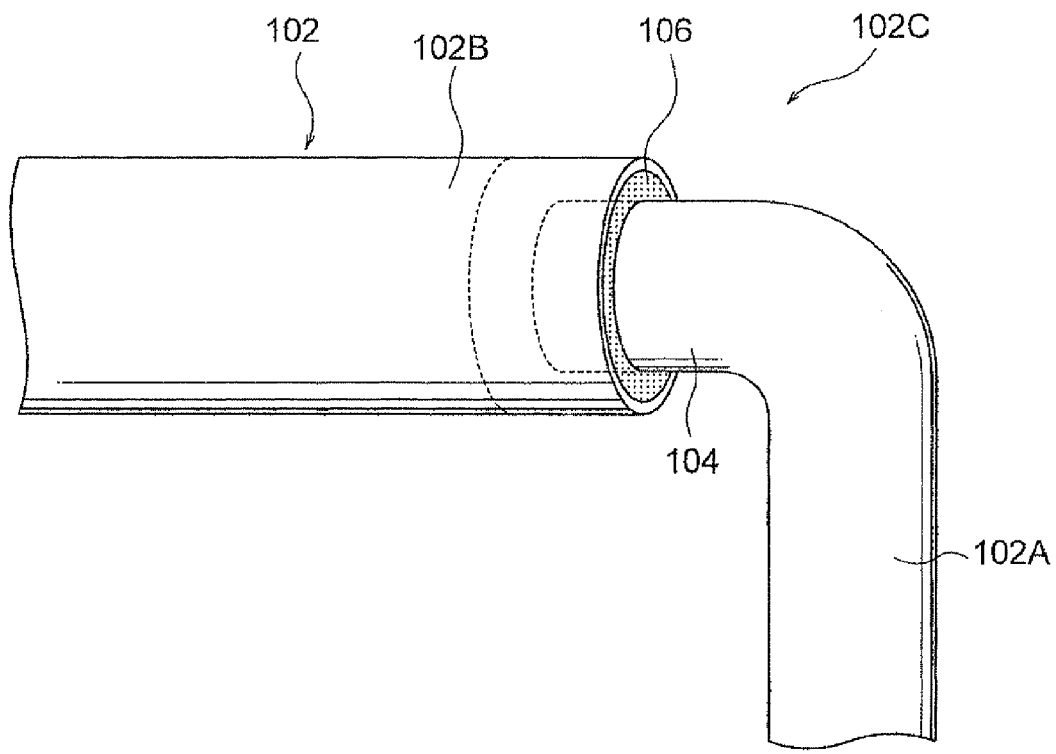
FIG.20

VEHICULAR SEAT

TECHNICAL FIELD

The present invention relates to a vehicular seat equipped with a headrest.

BACKGROUND ART

Heretofore, a vehicular seatback has been known (for example, see Patent Reference 1) in which a damping control device is provided between a seatback frame and an active headrest. This vehicular seatback is specified such that a resonance frequency of the damping control device substantially matches a lateral (left-right) resonance frequency of the active headrest. Thus, lateral direction vibrations of the seatback are mitigated.

Patent Reference 1: Japanese Patent Application Laid-Open (JP-A) No. 2007-161102

DISCLOSURE OF INVENTION

Problem to be Solved by the Invention

However, the vehicular seatback as described above has a structure in which the active headrest translationally moves to left and right with respect to the seatback frame. Therefore, it is difficult to sufficiently assure relative displacement amounts of the active headrest relative to the seatback frame, and a satisfactory vibration mitigation effect may not be obtained.

In consideration of the circumstances described above, an object of the present invention is to provide a vehicular seat that may effectively mitigate lateral (left-right) direction vibrations.

Means for Solving the Problem

A vehicular seat relating to an invention recited in claim 1 is provided with: a headrest in which one or a plurality of a joint portion is provided at a headrest frame, the headrest frame including a pair of left and right leg portions and a middle portion joining the pair of leg portions, and that is made turnable to left and right with respect to a seatback by the pair of leg portions being coupled to a seatback frame in a state in which the headrest frame is inflectingly operable at the joint portion; and an urger (urging means) that urges the headrest to a middle portion of a range of turning with respect to the seatback.

In the vehicular seat recited in claim 1, the headrest frame is coupled to the seatback frame, at the one or a plural number of joint portions, in an inflectingly operable state. Thus, the headrest is made turnable to left and right with respect to the seatback (capable of pendulum movements). Furthermore, the headrest is urged toward the middle position of the range of turning relative to the seatback by the urger. Therefore, the headrest may be caused to function as a dynamic damper when lateral direction vibrations are applied to the present vehicular seat. Therefore, lateral direction vibrations of the present vehicular seat may be mitigated. Moreover, relative displacement amounts of the headrest relative to the seatback may be made larger than in a case in which the headrest translationally moves to left and right relative to the seatback. Therefore, the effect of serving as a dynamic damper that the headrest exhibits may be increased, and lateral direction vibrations may be effectively mitigated.

A vehicular seat relating to an invention recited in claim 2 is the vehicular seat recited in claim 1, in which, in the headrest frame, a bending angle at the joint portion is limited to within a predetermined range by one side portion and another side portion between which the joint portion is interposed coming into contact with one another.

In the vehicular seat recited in claim 2, the bending angle of the joint portion of the headrest frame is restricted to within the predetermined range. Therefore, a great deformation of the headrest frame by an external force may be suppressed. Furthermore, a great displacement of the headrest with respect to the seatback at the time of a vehicle collision or the like may be prevented.

A vehicular seat relating to an invention recited in claim 3 is the vehicular seat recited in claim 1 or claim 2, in which the headrest frame includes a vibration damping apparatus that extends and compresses in association with inflection operations of the joint portion, and the vibration damping apparatus provides damping force to the inflection operations.

In the vehicular seat recited in claim 3, the vibration damping apparatus applies damping force to inflection operations of the headrest frame, that is, to turning of the headrest relative to the seatback. Therefore, vibrations may be effectively mitigated by this damping force.

A vehicular seat relating to an invention recited in claim 4 is the vehicular seat recited in any one of claim 1 to claim 3, in which, in the headrest frame, the pair of leg portions are coupled to the seatback frame to be relatively turnable about a longitudinal (front and back) direction axis of the seatback.

In the vehicular seat recited in claim 4, the pair of leg portions of the headrest frame are relatively turnably coupled to the seatback frame. Therefore, a number of joint portions to be provided at the headrest frame may be reduced.

A vehicular seat relating to an invention recited in claim 5 is the vehicular seat recited in claim 4, in which, in the headrest frame, the pair of leg portions and the middle portion are divided and are coupled by a coupling member that constitutes the joint portion.

In the vehicular seat recited in claim 5, the pair of leg portions of the headrest frame are relatively turnably coupled to the seatback frame, and joint portions are provided between the pair of leg portions and the middle portion. Thus, a four-link mechanism (four-bar linkage) may be structured. Therefore, the headrest may be stably turned with respect to the seatback (pendulum movements).

A vehicular seat relating to an invention recited in claim 6 is the vehicular seat recited in claim 4, in which, in the headrest frame, the middle portion is divided between left and right and is coupled by a coupling member that constitutes the joint portion.

In the vehicular seat recited in claim 6, the pair of leg portions of the headrest frame are relatively turnably coupled to the seatback frame, and only one joint portion is provided, at the middle portion of the headrest frame. Thus, the headrest may be turned to left and right with respect to the seatback, and therefore the headrest frame may be given a simple structure.

A vehicular seat relating to an invention recited in claim 7 is the vehicular seat recited in claim 3, in which, in the headrest frame, the pair of leg portions and the middle portion are divided and are coupled by a coupling member that constitutes the joint portion, the middle portion is provided with a vibration damping apparatus and is made extensible and compressible, one of the leg portions is coupled to the seatback frame to be relatively turnable about a longitudinal direction axis of the seatback, and the other of the leg portions is coupled to the seatback frame to be relatively non-movable.

In the vehicular seat recited in claim 7, one of the pair of leg portions relatively turns about the longitudinal direction axis of the seatback by the middle portion of the headrest frame extending and compressing. Therefore, the headrest may be turned to left and right with respect to the seatback. Moreover, because the vibration damping apparatus is provided at the middle portion of the headrest frame, the headrest frame may be given a simple structure.

A vehicular seat relating to an invention recited in claim 8 is the vehicular seat recited in any one of claim 5 to claim 7, in which the coupling member is a rod whose axial direction is along the longitudinal direction of the seatback.

In the vehicular seat recited in claim 8, because the joint portion of the headrest frame is structured by a coupling mechanism with the rod, the joint portion of the headrest frame may be given a simple structure.

A vehicular seat relating to an invention recited in claim 9 is the vehicular seat recited in any one of claim 5 to claim 7, in which the coupling member is a resilient body.

In the vehicular seat recited in claim 9, because the joint portion of the headrest frame is structured by a coupling mechanism with the resilient body, the joint portion of the headrest frame may be given a simple structure.

A vehicular seat relating to an invention recited in claim 10 is provided with: a headrest that includes a headrest frame that is made deformable by provision of one or a plurality of a joint portion, and that is made turnable to left and right with respect to a seatback by the headrest frame being coupled to a seatback frame in a deformable state; and an urger that urges the headrest to a middle portion of a range of turning with respect to the seatback.

In the vehicular seat recited in claim 10, the headrest frame is coupled to the seatback frame at the one or a plural number of joint portions in the deformable state. Thus, the headrest is made turnable to left and right with respect to the seatback (capable of pendulum movements). Furthermore, the headrest is urged toward the middle position of the range of turning relative to the seatback by the urger. Therefore, the headrest may be caused to function as a dynamic damper when lateral direction vibrations are applied to the present vehicular seat. Therefore, lateral direction vibrations of the present vehicular seat may be mitigated. Moreover, relative displacement amounts of the headrest relative to the seatback may be made larger than in a case in which the headrest translationally moves to left and right relative to the seatback. Therefore, the effect of serving as a dynamic damper that the headrest exhibits may be increased, and lateral direction vibrations may be effectively mitigated.

A vehicular seat relating to an invention recited in claim 11 is provided with: a headrest that includes a headrest frame in which a deformer (deforming means) for deforming the same is provided, and that is made turnable to left and right with respect to a seatback by the headrest frame being coupled to a seatback frame in a deformable state; and an urger that urges the headrest to a middle portion of a range of turning with respect to the seatback.

In the vehicular seat recited in claim 11, the headrest frame at which the deformer is provided is coupled to the seatback frame in the deformable state. Thus, the headrest is made turnable to left and right with respect to the seatback (capable of pendulum movements). Furthermore, the headrest is urged toward the middle position of the range of turning relative to the seatback by the urger. Therefore, the headrest may be caused to function as a dynamic damper when lateral direction vibrations are applied to the present vehicular seat. Therefore, lateral direction vibrations of the present vehicular seat may be mitigated. Moreover, relative displacement amounts of the headrest relative to the seatback may be made larger than in a case in which the headrest translationally moves to left and right relative to the seatback. Therefore, the effect of serving as a dynamic damper that the headrest exhibits may be increased, and lateral direction vibrations may be effectively mitigated.

Effects of the Invention

As described above, with the vehicular seat relating to the invention recited in claim 1, lateral direction vibrations may be effectively mitigated.

With the vehicular seat relating to the invention recited in claim 2, great deformations of the headrest frame by external forces may be suppressed and great displacements of the headrest relative to the seatback at the time of a vehicle collision or the like may be prevented.

With the vehicular seat relating to the invention recited in claim 3, vibrations may be effectively mitigated by the damping force that is generated by the vibration damping apparatus.

With the vehicular seat relating to the invention recited in claim 4, the number of joint portions to be provided at the headrest frame may be reduced.

With the vehicular seat relating to the invention recited in claim 5, the headrest may be turned stably with respect to the seatback.

With the vehicular seat relating to the invention recited in claim 6, the headrest frame may be formed with a simple structure.

With the vehicular seat relating to the invention recited in claim 7, even when the headrest frame is provided with the vibration damping apparatus, the headrest frame may be formed with a simple structure.

With the vehicular seat relating to the invention recited in claim 8, the joint portion of the headrest frame may be formed with a simple structure.

With the vehicular seat relating to the invention recited in claim 9, the joint portion of the headrest frame may be formed with a simple structure.

With the vehicular seat relating to the invention recited in claim 10, lateral direction vibrations may be effectively mitigated.

With the vehicular seat relating to the invention recited in claim 11, lateral direction vibrations may be effectively mitigated.

BRIEF DESCRIPTION OF THE DRAWINGS

FIG. 20 is a perspective diagram illustrating structure of a joint portion of a headrest frame of a vehicular seat relating to a sixth exemplary embodiment of the present invention.

BEST MODE FOR CARRYING OUT THE INVENTION

First Exemplary Embodiment

Figure 1:
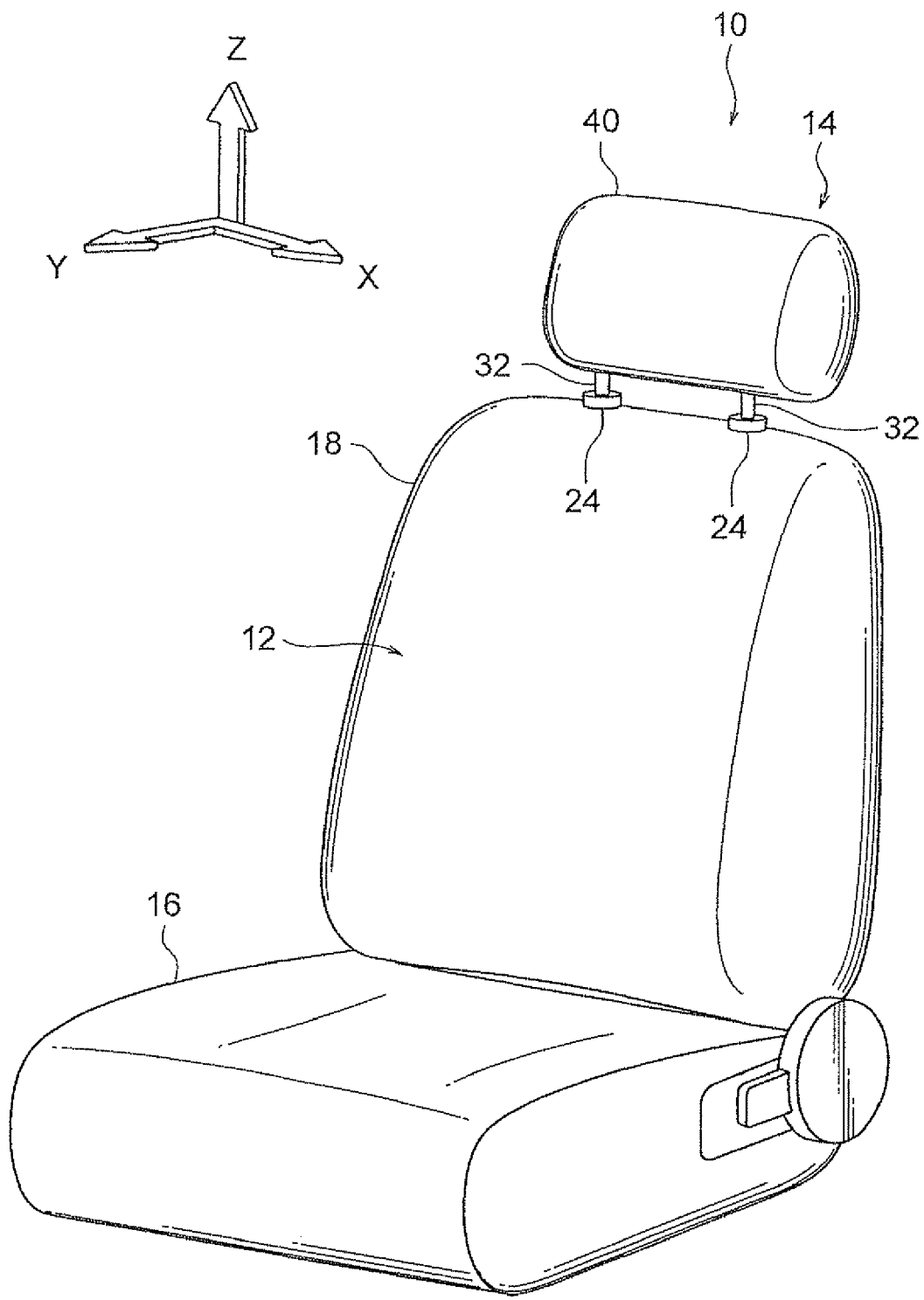
FIG. 1 is a perspective view illustrating a vehicular seat relating to a first exemplary embodiment of the present invention.

Herebelow, a vehicular seat 10 relating to a first exemplary embodiment of the present invention is described with reference to FIG. 1 to FIG. 11. Herein, arrow X in the drawings represents a left direction of a seatback 18 that structures the vehicular seat 10, arrow Y represents a forward direction of the seatback 18, and arrow Z represents an upward direction of the seatback 18. The lateral (left and right), longitudinal (front and back) and vertical (up and down) directions mentioned in the following descriptions represent directions with respect to the seatback 18.

As illustrated in FIG. 1, the vehicular seat 10 is provided with a seat main body 12 and a headrest 14. The seat main body 12 is structured by a seat cushion 16 that supports a buttocks portion of a seated occupant and the seatback 18 that supports a back portion of the seated occupant. The seat cushion 16 is coupled to the floor of an unillustrated vehicle body. A lower end portion of the seatback 18 is coupled to the seat cushion 16 via an unillustrated reclining mechanism.

Figure 2:
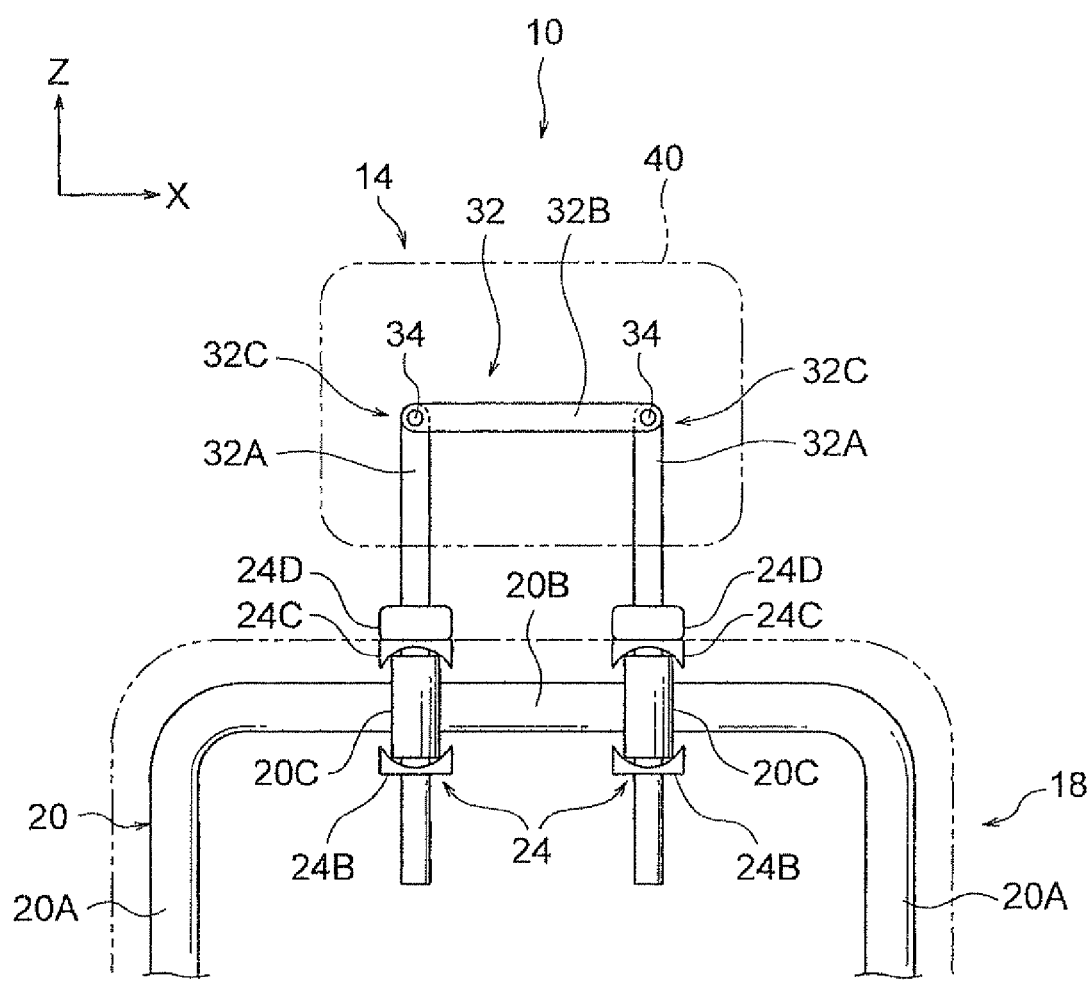
FIG. 2 is a front view illustrating structure of peripheral members including a headrest frame of the vehicular seat illustrated in FIG. 1.

As illustrated in FIG. 2, the seatback 18 is provided with a seatback frame 20, which is a skeleton member. The seatback frame 20 is provided with a pair of left and right side frames 20A that extend in the vertical direction of the seatback 18, an upper cross-member 20B that joins upper end portions of the side frames 20A, and an unillustrated lower cross-member that joins lower end portions of the side frames 20A.

A pair of left and right support brackets 20C are welded to a front side face of the upper cross-member 20B. The support brackets 20C are formed in square tube shapes and are disposed in states in which axial directions thereof are along the vertical direction of the seatback 18. Respective headrest supports 24 are supported by these support brackets 20C.

Figure 3:
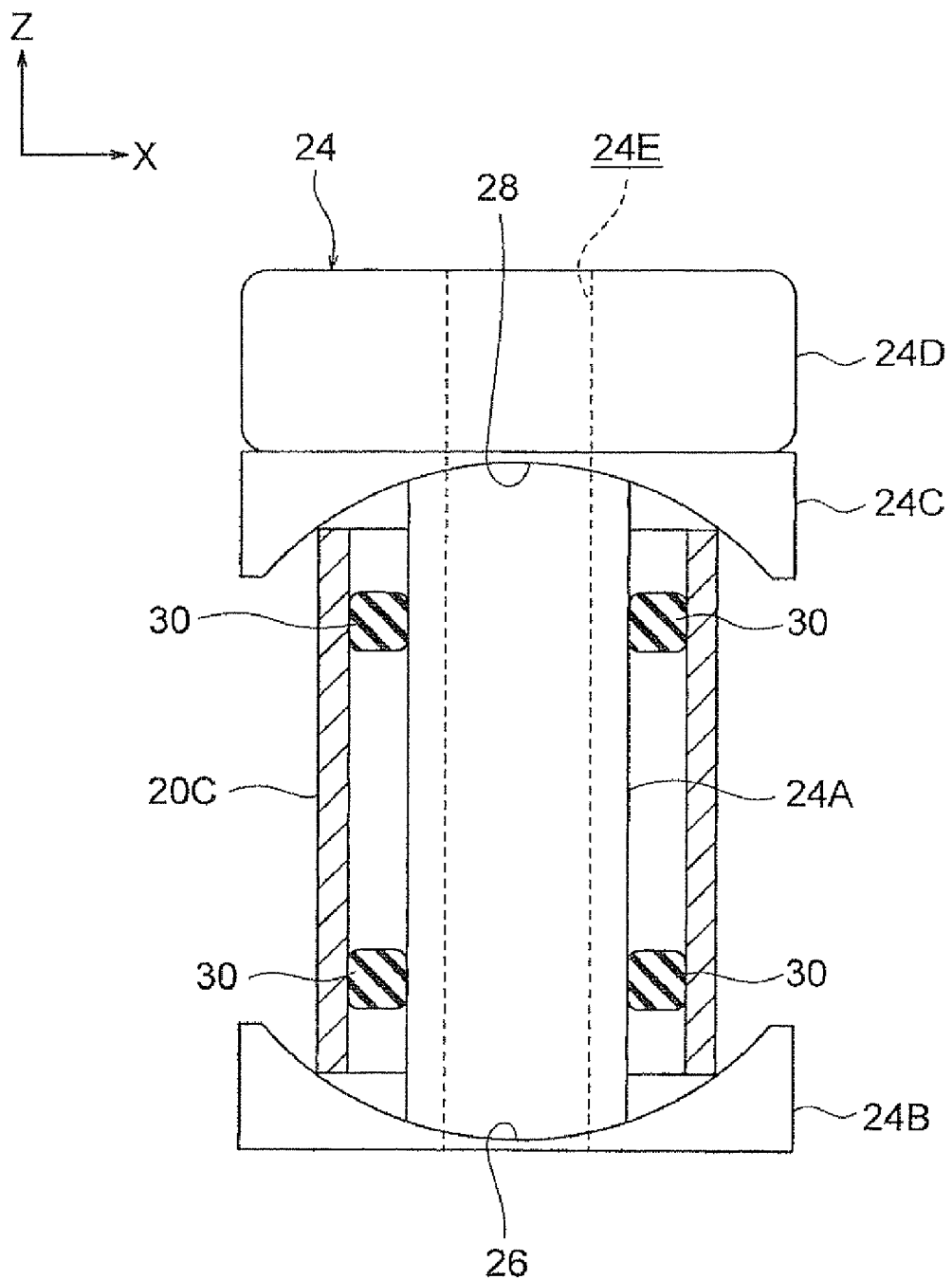
FIG. 3 is a partial sectional diagram illustrating structure of a headrest support and a support bracket of the vehicular seat illustrated in FIG. 1.

The headrest supports 24 are formed in long, narrow shapes. As illustrated in FIG. 3, the headrest supports 24 are each provided with a main body portion 24A that penetrates through the inner side of the support bracket 20C, a lower guide portion 24B that is provided at a lower end of the main body portion 24A, an upper guide portion 24C that is provided at an upper end of the main body portion 24A, and a locking portion 24D that is provided at the upper side of the upper guide portion 24C. A through-hole 24E is formed in the headrest support 24. The through-hole 24E penetrates therethrough in the length direction thereof (the vertical direction of the seatback 18).

A circular cylinder surface 26 (curved surface) is formed on the lower guide portion 24B. The circular cylinder surface 26 is centered on an axis along the longitudinal (front and back) direction of the seatback 18. This circular cylinder surface 26 abuts against the lower end of the support bracket 20C. A further circular cylinder surface 28 (curved surface) is formed on the upper guide portion 24C. The circular cylinder surface 28 is concentric with the circular cylinder surface 26 of the lower guide portion 24B. This circular cylinder surface 28 abuts against the upper end of the support bracket 20C. Thus, the headrest support 24 is supported to be relatively non-movable in the vertical direction with respect to the support brackets 20C (the seatback frame 20). In addition, the headrest support 24 is made relatively turnable with respect to the support brackets 20C (the seatback frame 20) about the axis along the longitudinal direction of the seatback 18 (see FIG. 4), by the circular cylinder surfaces 26 sliding against the lower ends of the support brackets 20C and the circular cylinder surfaces 28 sliding against the upper ends of the support brackets 20C.

Figure 4:
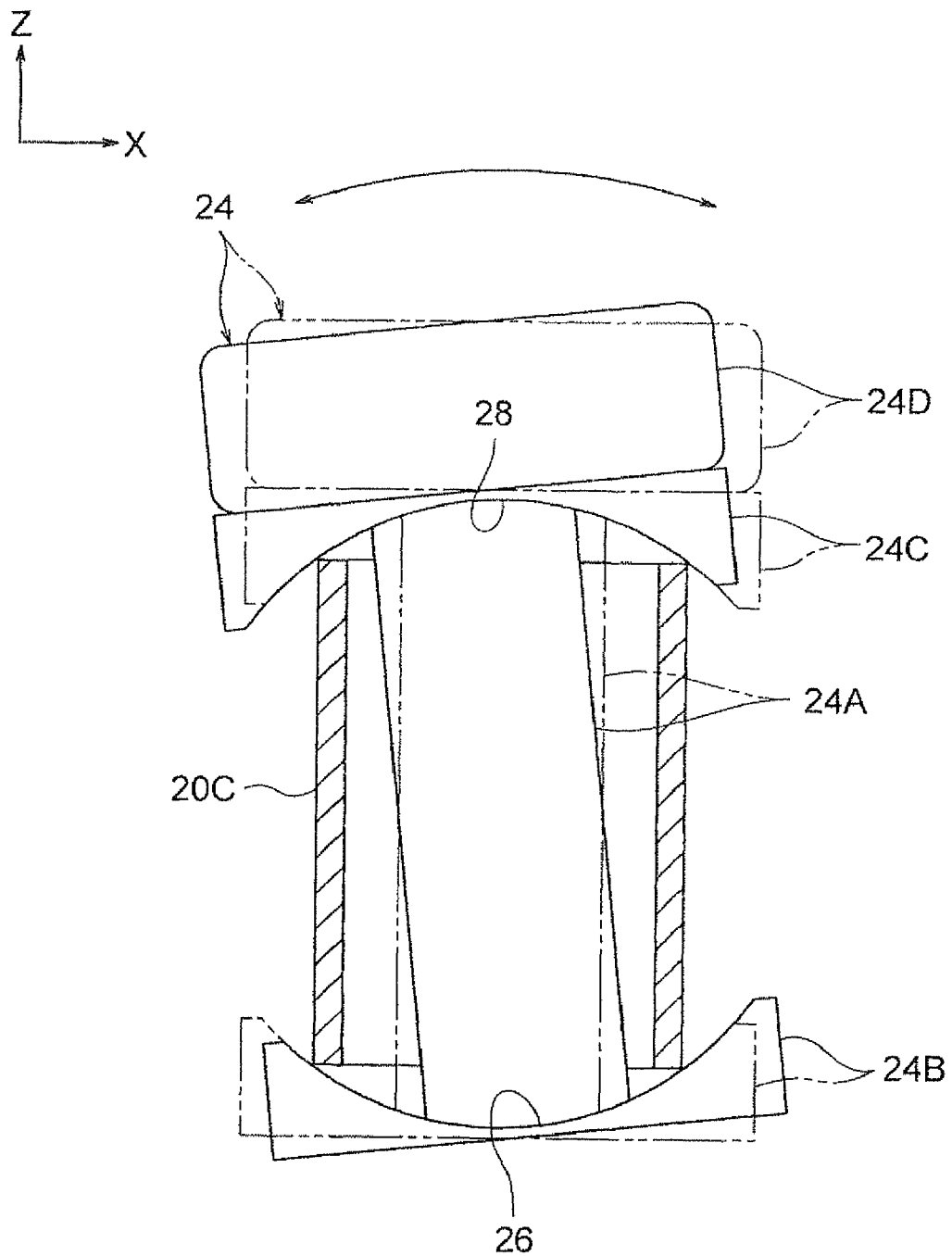
FIG. 4 is a partial sectional diagram for describing a state in which the headrest support illustrated in FIG. 3 is relatively turned with respect to the support bracket.

As illustrated in FIG. 3, plural rubber members 30 (in this case, two each at left and right) are disposed at both left and right sides of the main body portion 24A inside the support bracket 20C (but are not illustrated in FIG. 4). The rubber members 30 respectively constitute an urger (urging member). These rubber members 30 are formed in square rod shapes and touch against an inner periphery face of the support bracket 20C and an outer periphery face of the main body portion 24A. Thus, the headrest support 24 is urged toward a middle position of a range of relative turning with respect to the support brackets 20C (the position illustrated in FIG. 3), and is retained at this middle position at usual times. The rubber members 30 are resiliently deformed by external forces that are applied to the headrest support 24. Thus, relative turning of the headrest support 24 with respect to the support brackets 20C is allowed.

Herein, other kinds of resilient bodies may be used instead of the rubber members 30 in other exemplary embodiments. Moreover, numbers, shapes and the like of the rubber members 30 (resilient bodies) may be suitably modified. As a further example, a structure may be formed in which resiliently deformable protrusions (urgers) are provided at outer periphery portions of the main body portions 24A of the headrest support 24 and urge the headrest support 24 toward the middle position of the range of relative turning with respect to the support brackets 20C, by these protrusions being caused to abut against the inner periphery faces of the support brackets 20C.

A headrest frame 32 that is provided at the headrest 14 is coupled to the headrest support 24 with the above-described structure. The headrest frame 32 is provided with a pair of left and right leg portions 32A that extend in the vertical direction of the seatback 18 and a middle portion 32B that joins upper end portions of the pair of left and right leg portions 32A. Respective joint portions 32C (deformers) are formed between the pair of leg portions 32A and the middle portion 32B.

Figure 5:
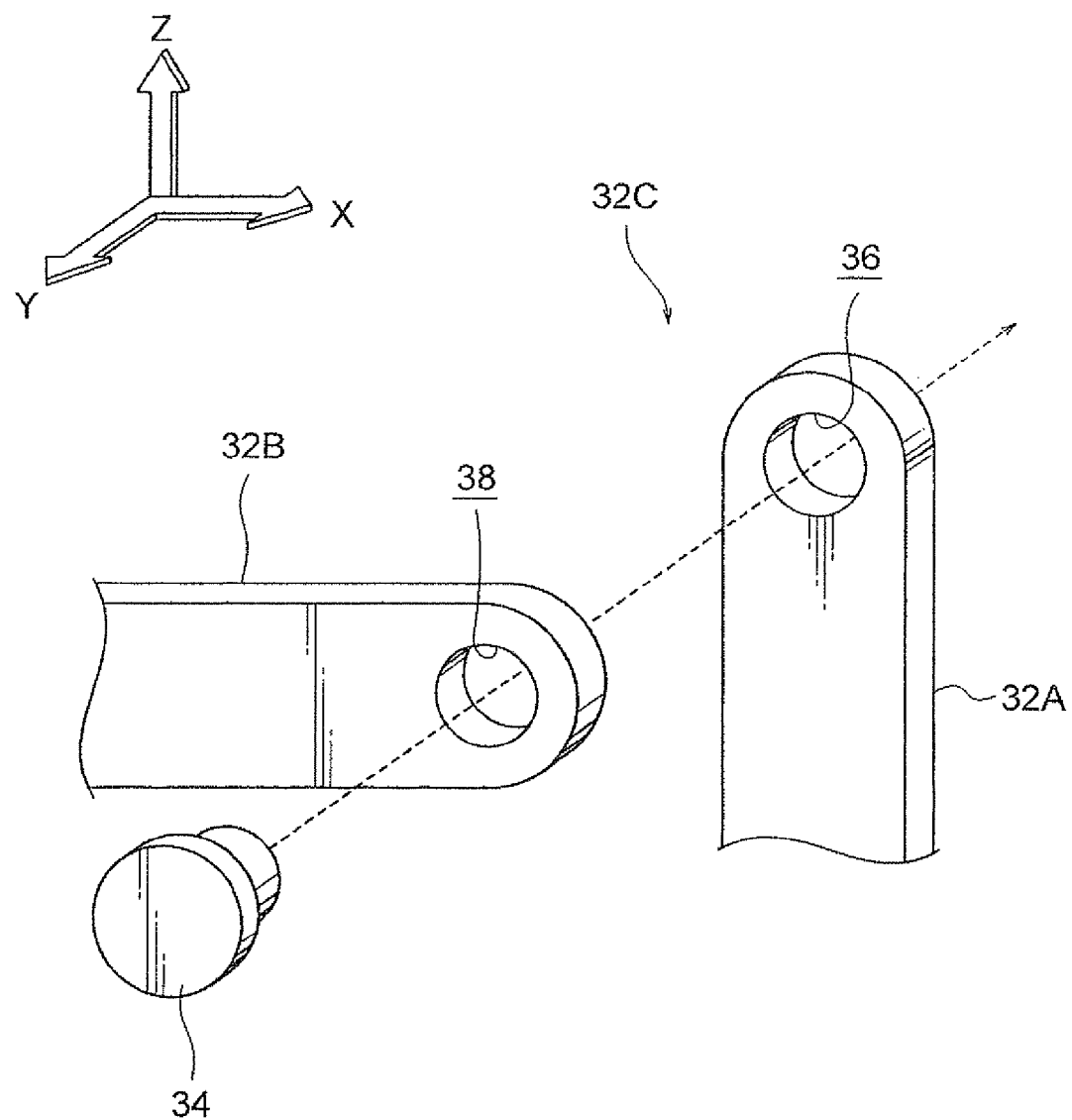
FIG. 5 is an exploded perspective diagram illustrating structure of a joint portion of the headrest frame illustrated in FIG. 2.

That is, this headrest frame 32 is divided into the pair of left and right leg portions 32A and the middle portion 32B, and upper end portions of the pair of leg portions 32A are coupled with lateral direction end portions of the middle portion 3213 by a pair of left and right pins 34 (rods). As illustrated in FIG. 5, these pins 34 are inserted through through-holes 36 formed in the upper end portions of the leg portions 32A and through-holes 38 formed in the lateral direction end portions of the middle portion 32B, and caulked. Thus, the pair of leg portions 32A and the middle portion 32B are coupled to be relatively turnable, and the headrest frame 32 is made inflectingly operable (deformable) at the joint portions 32C between the pair of leg portions 32A and the middle portion 32B. In the present exemplary embodiment, the leg portions 32A and the middle portion 3213 are all formed in long, narrow strip shapes.

The pair of leg portions 32A are inserted, leading with respective lower ends thereof, into the through-holes 24E of the headrest supports 24. Relative movement of the leg portions 32A relative to the headrest supports 24 in the axial directions thereof is regulated by unillustrated locking members that are provided at the locking portions 24D of the headrest supports 24. Thus, the pair of leg portions 32A of the headrest frame 32 are coupled to the seatback frame 20 via the headrest supports 24.

Figure 6A:
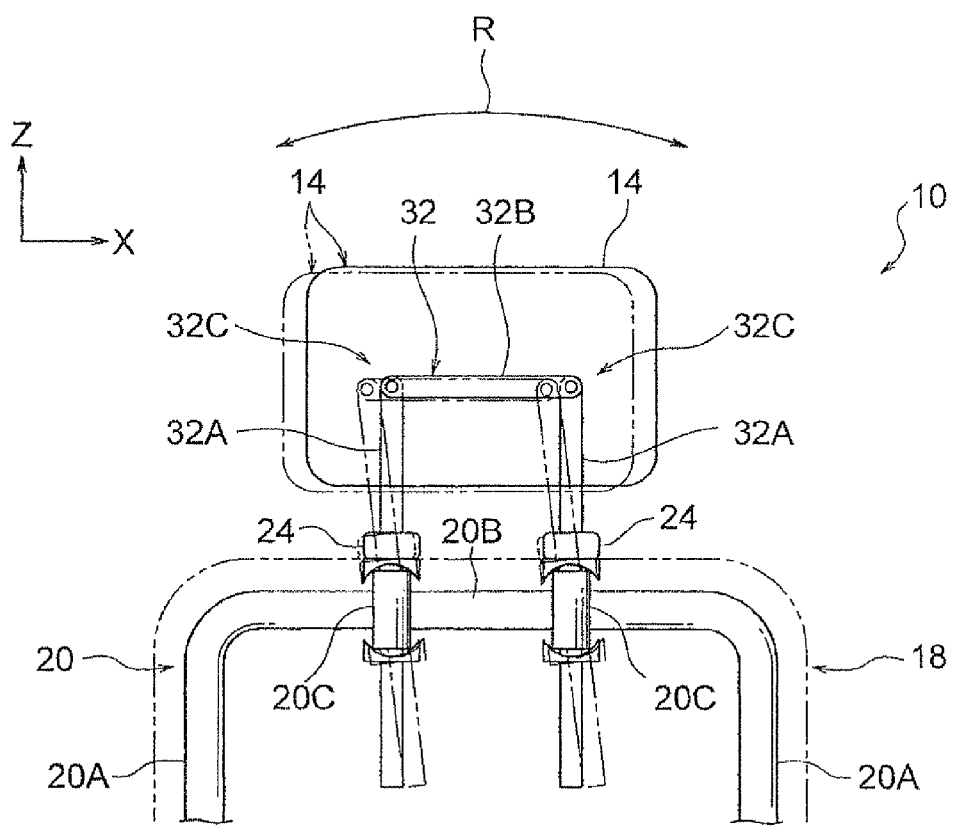
FIG. 6A is a front view for describing a state in which the headrest frame illustrated in FIG. 2 is relatively turned with respect to a seatback frame.

Now, as described above, each headrest support 24 is made relatively turnable with respect to the seatback frame 20 about the axis along the longitudinal direction of the seatback 18. Therefore, the pair of leg portions 32A coupled to the seatback frame 20 via the headrest supports 24 are made relatively turnable with respect to the seatback frame 20 about the axis along the longitudinal direction of the seatback 18. Furthermore, the pair of left and right pins 34 of the headrest frame 32 are disposed in states in which axial directions thereof are along the longitudinal direction of the seatback 18, and the pair of left and right leg portions 32A are coupled in the lateral direction of the seatback 18 via the pins 34 and the middle portion 32B. Thus, a four-link mechanism (four-bar linkage) is structured, and the headrest frame 32 is made turnable to left and right relative to the seatback frame 20 (capable of pendulum movements) in the X-Z plane (in a plane orthogonal to the longitudinal direction of the seatback 18) as illustrated in FIG. 6A (see arrow R in FIG. 6A).

Furthermore, as described above, the headrest supports 24 are urged toward the middle position of the range of relative turning with respect to the support brackets 20C by the plural rubber members 30. Therefore, at usual times the pair of leg portions 32A of the headrest frame 32 are retained at the middle position shown by solid lines in FIG. 6.

A main body portion 40 of the headrest 14 is attached to the headrest frame 32 with the structure described above. This main body portion 40 is structured with a cushion covered by a skin as a principal element thereof and, in the present first exemplary embodiment, is coupled to the middle portion 32B of the headrest frame 32. Therefore, the main body portion 40 turns to left and right with respect to the seatback 18 (pendulum movements) in association with the aforementioned pendulum movements of the headrest frame 32, and at usual times is retained at the middle position of the range of this turning. A lateral resonance frequency of this headrest 14 is set so as to substantially match a lateral resonance frequency of the seat main body 12 during idling of an engine of the vehicle.

Figure 6B:
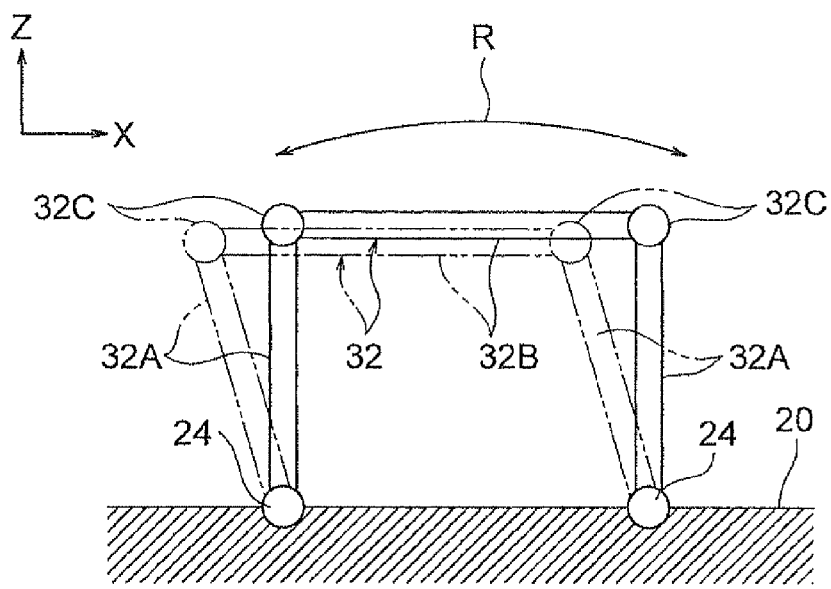
FIG. 6B is a conceptual diagram of the headrest frame illustrated in FIG. 6A.
Figure 7A:
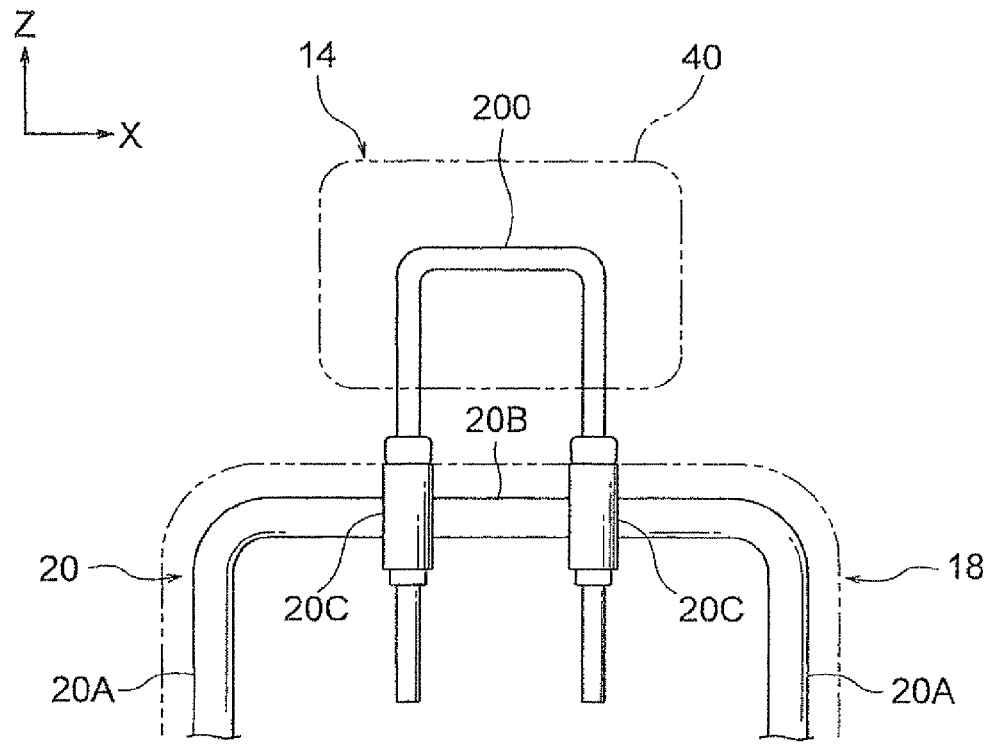
FIG. 7A is a front view illustrating structure of an ordinary headrest frame and peripheral members thereof.
Figure 7B:
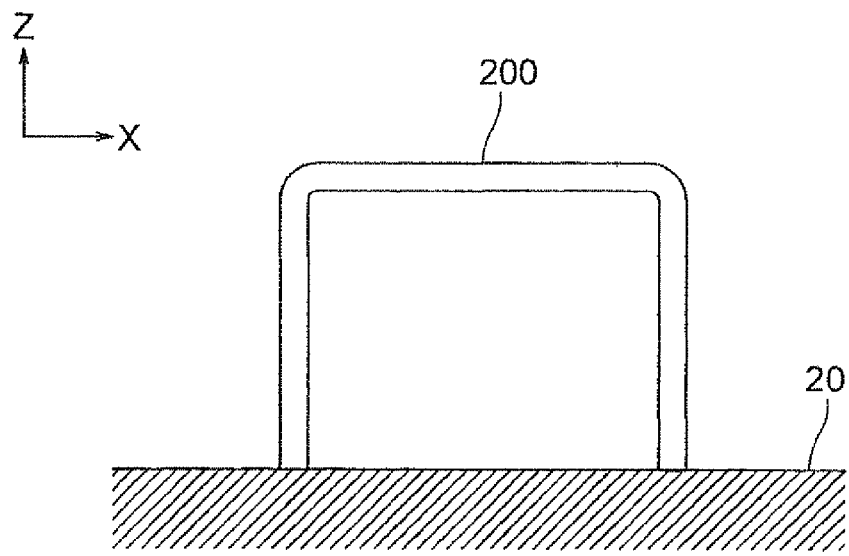
FIG. 7B is a conceptual diagram of the headrest frame illustrated in FIG. 7A.

In FIG. 6B, a conceptual diagram for describing inflection operations of the headrest frame 32 is illustrated. In FIG. 7A, an ordinary headrest frame 200 (one in which the joint portions are not provided) is illustrated for comparison. In FIG. 7B, a conceptual diagram of this headrest frame 200 is illustrated. With this ordinary headrest frame 200, relative movements to left and right with respect to the seatback frame 20 are not possible.

Next, operations and effects of the present first exemplary embodiment are described.

In this first exemplary embodiment, when a lateral direction vibration is applied to the vehicular seat 10 by vehicle body vibrations during idling of the engine of the vehicle, lateral direction inertial force acts on the headrest 14. Therefore, in accordance with this inertial force, the pair of leg portions 32A of the headrest frame 32 turn to left and right with respect to the seatback 18 while causing the plural rubber members 30 to resiliently deform. Thus, the headrest 14 performs pendulum movements (vibrations describing a circular arc) relative to the seatback 18. At this time, resilient force (restoring force) from the plural rubber members 30 acts in directions to push back the deflections of the upper portion of the seatback 18. Therefore, vibrations of the seat main body 12 are suppressed by the resilient force of these rubber members 30. That is, in this vehicular seat 10, the headrest 14 functions as a dynamic damper and thus lateral direction vibrations of the seat main body 12 are mitigated.

Furthermore, in the vehicular seat 10, the headrest 14 is made turnable to left and right (capable of pendulum movements) with respect to the seatback 18. Therefore, compared with a case in which the headrest 14 performs translational movements to left and right relative to the seatback 18 (relatively moves linearly), relative displacement amounts of the headrest 14 with respect to the seatback 18 are set to be larger. Therefore, the effect of serving as a dynamic damper that the headrest 14 exhibits may be increased.

Figure 8A:
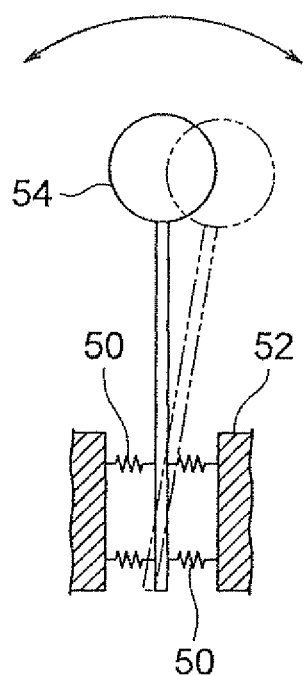
FIG. 8A is a conceptual diagram illustrating a pendulum movement dynamic damper.
Figure 8B:
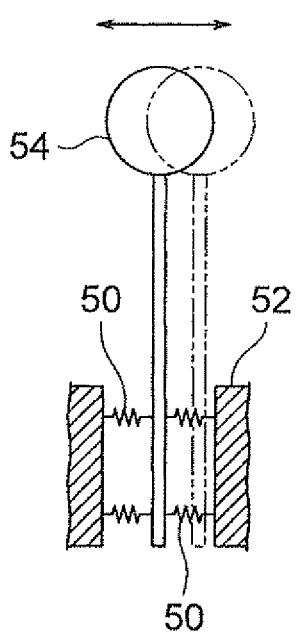
FIG. 8B is a conceptual diagram illustrating a translational movement dynamic damper.

That is, as illustrated in FIG. 8A and FIG. 8B, when a weight 54 that is supported at a support body 52 via resilient bodies 50 (in this case, springs) is relatively moved to left and right with respect to the support body 52, because moment is applied to the support body 52 by the pendulum movement illustrated in FIG. 8A, a mass effect of the weight 54 is larger than with the translational movement illustrated in FIG. 8B.

Figure 9A:
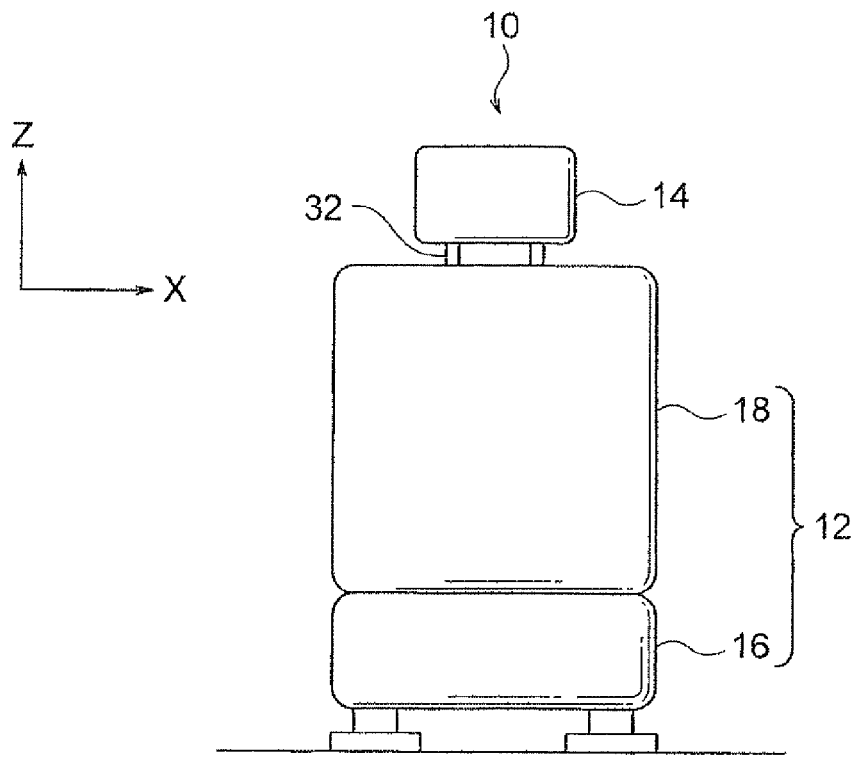
FIG. 9A is a schematic front view of the vehicular seat relating to the present first exemplary embodiment.
Figure 9B:
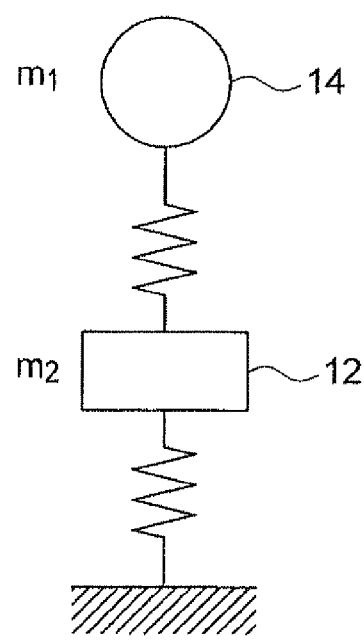
FIG. 9B is a conceptual diagram for describing a mass effect of the vehicular seat illustrated in FIG. 9A.
Figure 10:
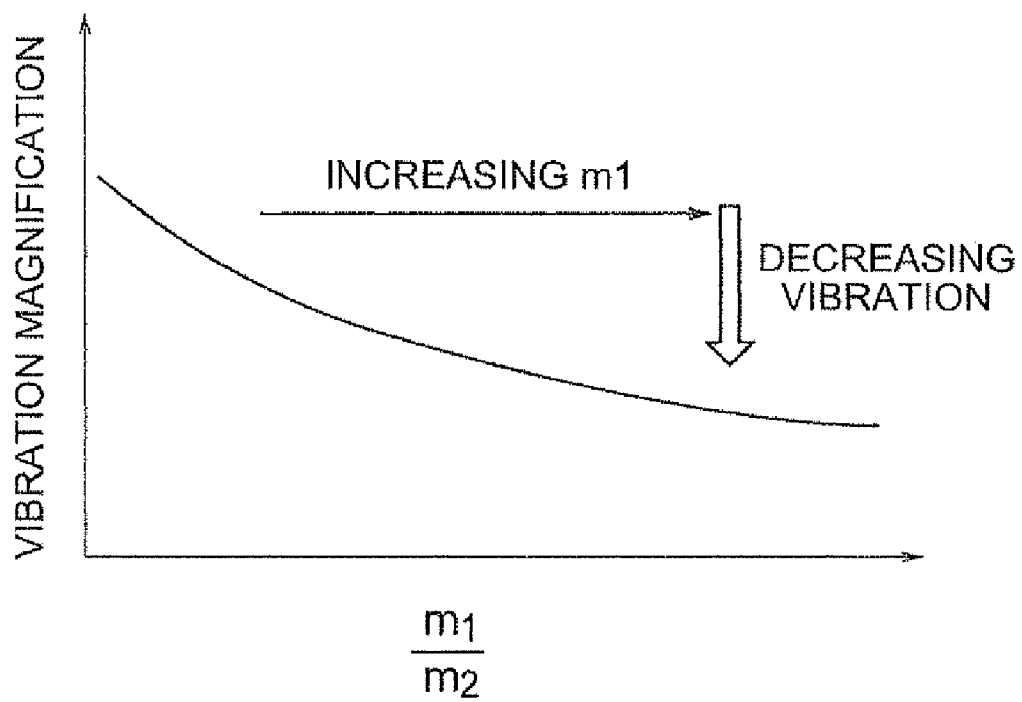
FIG. 10 is a graph illustrating a relationship between equivalent masses of the headrest and a seat main body and vibration magnification at the seat main body.

Further yet, as illustrated in FIG. 9A and FIG. 9B, if an equivalent mass of the headrest 14 is represented by m1 and a mass of the seat main body 12 is represented by m2, then as illustrated in FIG. 10, vibration magnification of the seat main body 12 is mitigated as m1 becomes larger (the vibration mitigation effect increases in accordance with the mass of the dynamic damper).

Therefore, with a structure as in the present vehicular seat 10 in which the headrest 14 performs turning movements (pendulum movements) relative to the seatback 18, the mass effect of the headrest 14 is large and lateral direction vibrations of the seat main body 12 are effectively mitigated.

Figure 11:
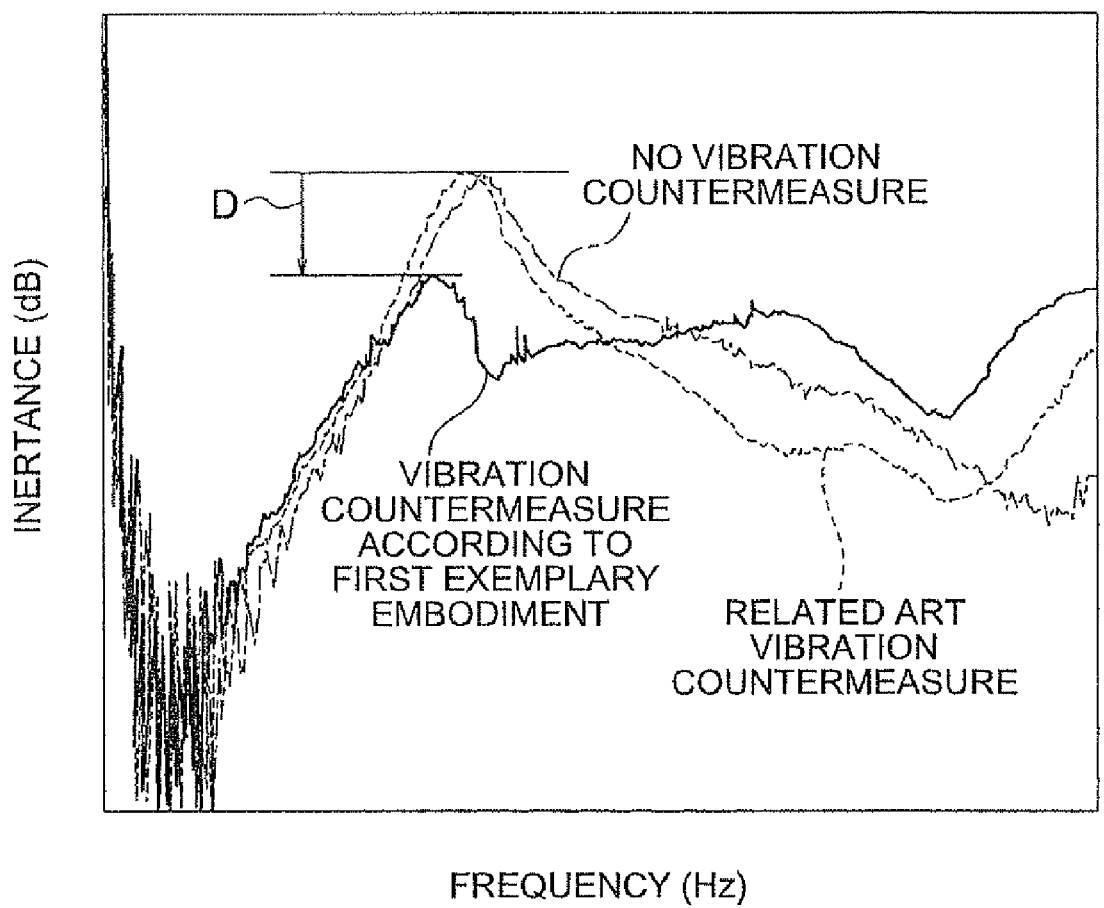
FIG. 11 is a graph illustrating results of measurement of lateral direction vibration levels in vehicular seats.

Now, in FIG. 11, results of measurement of lateral direction vibration levels of vehicular seats (relationships between frequency and inertance) are illustrated in a graph. In FIG. 11, the single dot chain line shows vibration levels of an ordinary vehicular seat in which a vibration countermeasure is not employed (see FIG. 7). Further in FIG. 11, the dotted line shows vibration levels of a vehicular seat in which a related art vibration countermeasure is employed (a vehicular seat with a structure in which the headrest translationally moves to left and right relative to the seatback). Further yet in FIG. 11, the solid line shows vibration levels of the vehicular seat 10 in which the vibration countermeasure according to the present first exemplary embodiment is employed (a vehicular seat with a structure in which the headrest 14 performs turning movements to left and right relative to the seatback 18). From FIG. 11, it is seen (see arrow D in FIG. 11) that the vibration mitigation effect is larger in the vehicular seat 10 than in the vehicular seat in which a vibration countermeasure is not employed and the vehicular seat in which the related art vibration countermeasure is employed.

The headrest structure (vibration mitigation structure) relating to the vehicular seat 10 is applicable to all headrests that are made separate from the seatback 18. Therefore, the headrest structure has a broader range of application than a structure that may not be applied in a case in which an active headrest is not provided, such as the vehicular seat described in the Background Art section, and is excellent.

In the vehicular seat 10, because the four-link mechanism is structured by the headrest frame 32, the headrest supports 24 and the like, the headrest 14 turns stably relative to the seatback 18.

In the vehicular seat 10, because the pair of leg portions 32A of the headrest frame 32 are each relatively turnably coupled to the seatback frame 20, the four-link mechanism is structured with just the two joint portions 32C provided at the headrest frame 32, and the structure of the headrest frame 32 is simplified. Therefore, fabrication of the headrest frame 32 may be made simple and a cost reduction in costs of fabrication may be enabled.

In the vehicular seat 10, because the joint portions 32C of the headrest frame 32 are formed as simple coupling structures with the pins 34, fabrication of the headrest frame 32 is simplified accordingly, and a reduction in costs may be enabled.

In the present vehicular seat 10, because there is no need to provide a damping control device as in the vehicular seatback described in the Background Art section, an increase in weight due to addition of a damping control device may be suppressed.

The first exemplary embodiment described above has a structure in which the pair of leg portions 32A of the headrest frame 32 are coupled to be relatively turnable about the longitudinal direction axis of the seatback 18 with respect to the seatback frame 20. However, the present invention is not to be limited thus. That is, a structure may be formed in which the pair of left and right headrest supports 24 are relatively non-turnably attached to the seatback frame 20 and further joint portions are provided between the headrest supports 24 and the joint portions 32C (a structure in which joint portions are provided at length direction middle portions of the pair of leg portions 32A). In the case of this structure too, the headrest 14 may be turned to left and right with respect to the seatback 18, about the joint portions provided at the length direction middle portions of the pair of leg portions 32A. This point similarly applies to other exemplary embodiments of the present invention that are described hereinafter.

In the first exemplary embodiment described above, a structure may be formed in which an absorber (a vibration damping apparatus) spans between a length direction middle portion of the pair of leg portions 32A of the headrest frame 32 and a length direction middle portion of the middle portion 32B, between a length direction middle portion of one of the leg portions 32A and a length direction middle portion of the other of the leg portions 32A, or the like, and the absorber applies damping force to inflection operations of the headrest frame 32. In such a case, vibrations of the seat main body 12 may be more even more effectively mitigated by the damping force of the absorber. This point similarly applies to the other exemplary embodiments of the present invention that are described hereinafter.

Next, the other exemplary embodiments of the present invention are described. Structures and operations that are basically the same as in the first exemplary embodiment are assigned the same reference numerals as in the first exemplary embodiment and descriptions thereof will not be given.

Second Exemplary Embodiment

Figure 12:
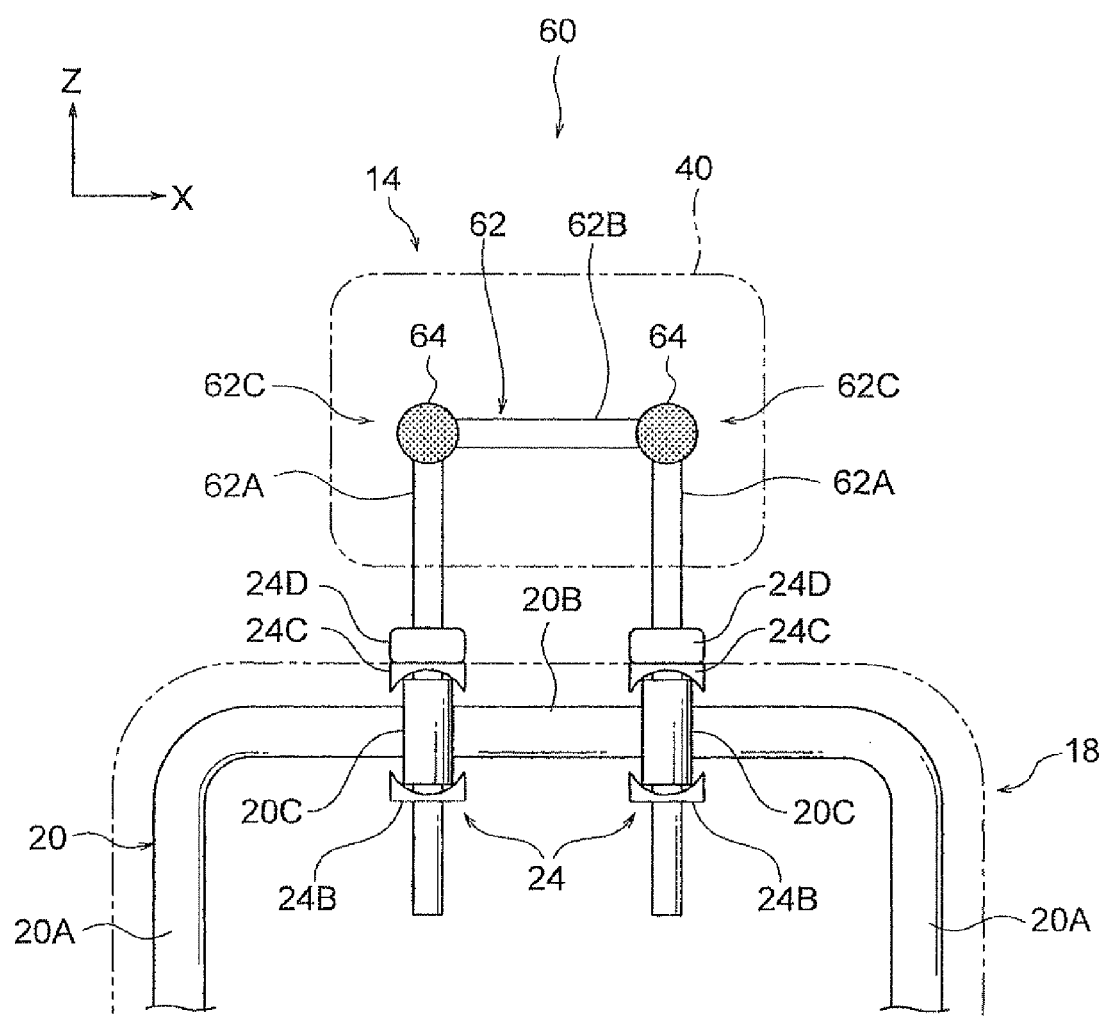
FIG. 12 is a front view illustrating structure of peripheral members including a headrest frame of a vehicular seat relating to a second exemplary embodiment of the present invention.

In FIG. 12, partial structure of a vehicular seat 60 relating to a second exemplary embodiment of the present invention is illustrated in a schematic front view. This vehicular seat 60 has a basically similar structure to the vehicular seat 10 relating to the first exemplary embodiment. However, in this vehicular seat 60, structure of a headrest frame 62 differs from the headrest frame 32 relating to the first exemplary embodiment.

Figure 13:
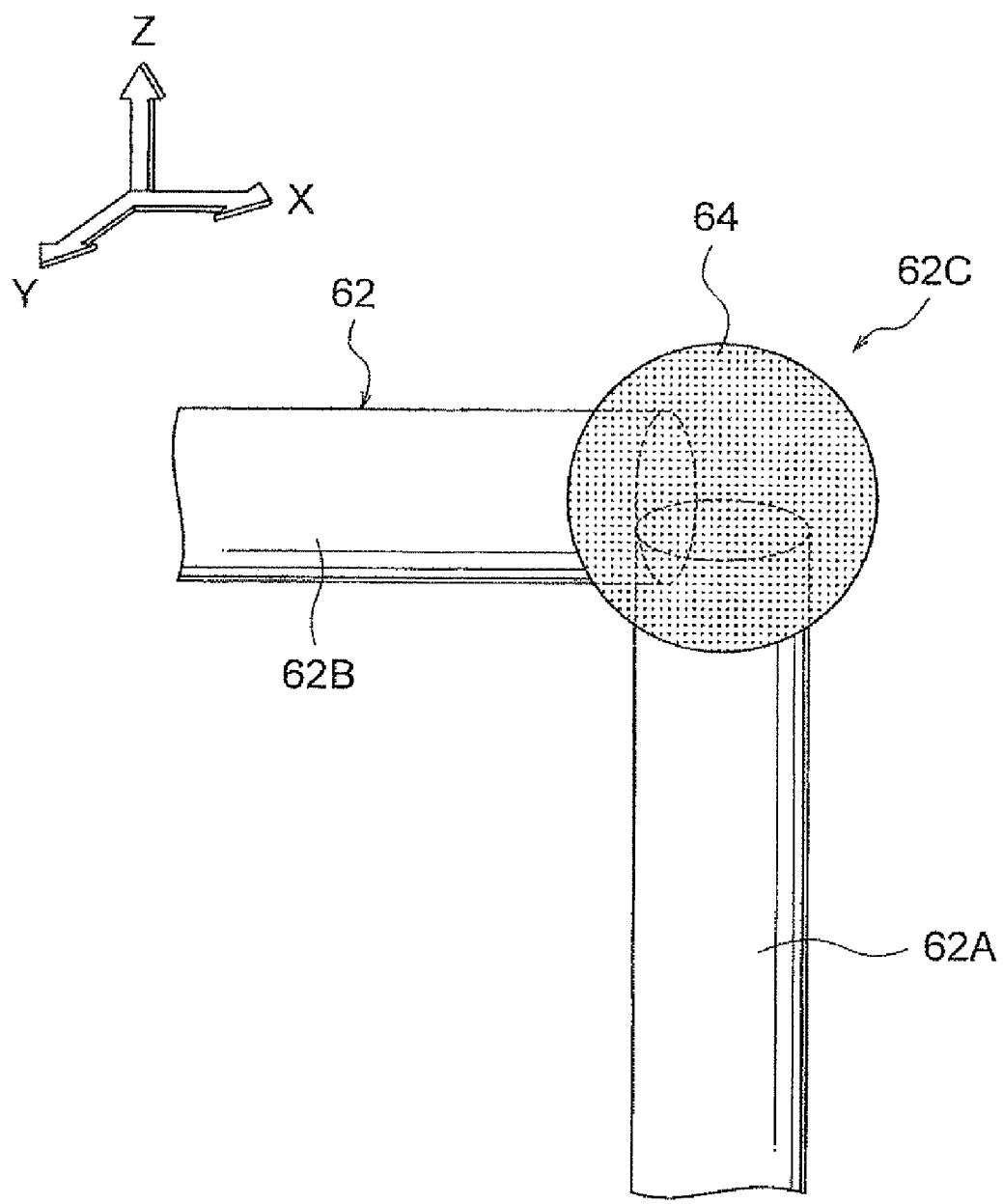
FIG. 13 is a perspective diagram illustrating structure of a joint portion of the headrest frame illustrated in FIG. 12.

Similarly to the headrest frame 32 relating to the first exemplary embodiment, this headrest frame 62 is provided with a pair of left and right leg portions 62A and a middle portion 62B. The right side leg portion 62A is divided from the middle portion 62B and the left side leg portion 62A is divided from the middle portion 62B. The leg portions 62A and the middle portion 62B are coupled to be relatively turnable by a pair of left and right rubber members 64 (resilient bodies). These rubber members 64 are formed in spherical shapes as illustrated in FIG. 13. Upper end portions of the leg portions 62A and lateral direction end portions of the middle portion 62B are embedded in the rubber members 64 and coupled thereto. Thus, left and right joint portions 62C of the headrest frame 62 are structured.

In this exemplary embodiment too, inflection operations of the headrest frame 62 may be caused at the joint portions 62C. Therefore, basically the same operational effects as in the first exemplary embodiment are realized. Moreover, in this exemplary embodiment, because the headrest frame 62 is urged by resilient force of the rubber members 64 toward the middle position of the range of turning relative to the seatback 18, the rubber members 64 may be also utilized as an urger. Further, because the joint portions 62C are structured by the rubber members 64, the joint portions 62C may be given a simple structure.

In the above-described second exemplary embodiment, a structure may be formed in which one of the pair of rubber members 64 is omitted and the leg portion 62A and middle portion 62B are fixedly coupled at that one side (a structure in which one of the joint portions 62C is omitted). Further, one of the joint portions 62C may have a coupling structure with the rubber member 64 and the other of the joint portions 62C may have a coupling structure with the pin 34 relating to the first exemplary embodiment. Further yet, coupling structures that use resilient bodies other than the rubber members 64 are possible.

Third Exemplary Embodiment

Figure 14:
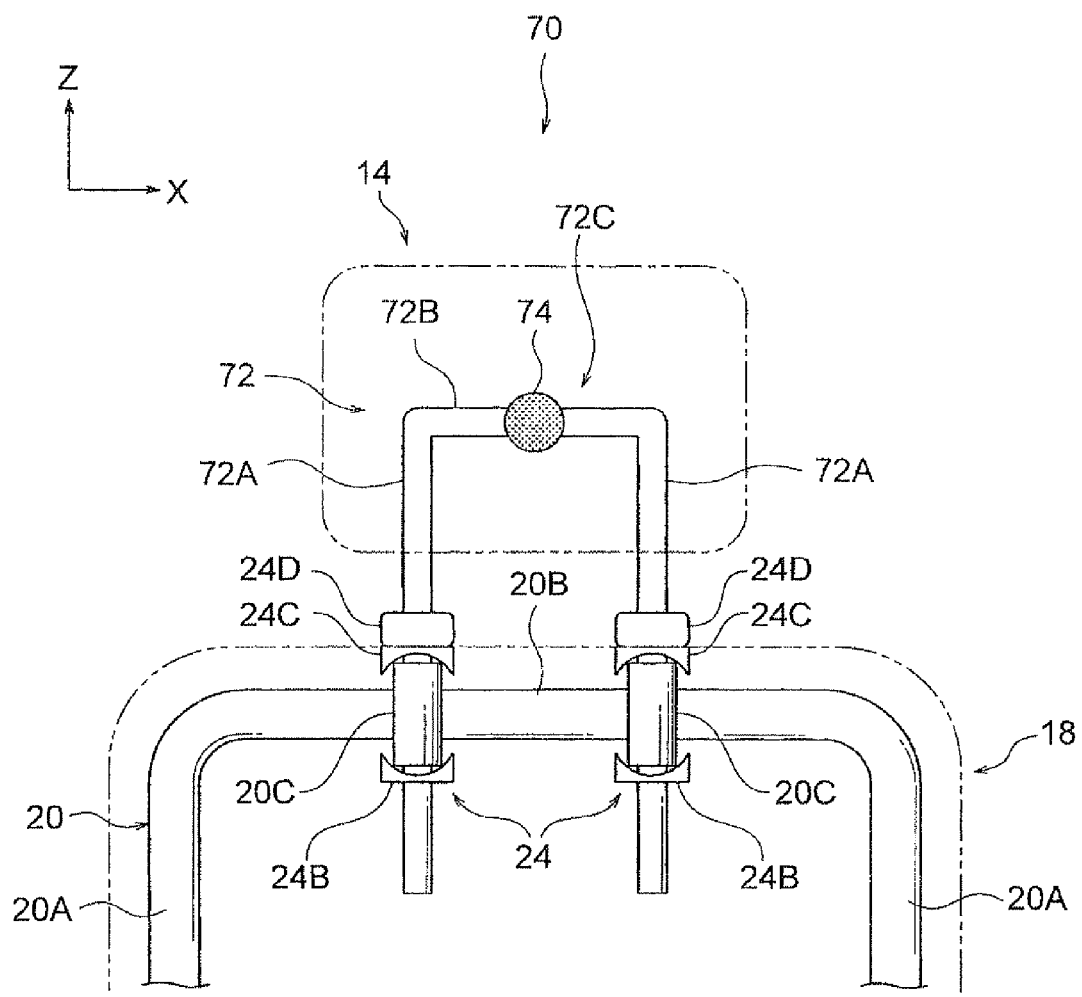
FIG. 14 is a front view illustrating structure of peripheral members including a headrest frame of a vehicular seat relating to a third exemplary embodiment of the present invention.

In FIG. 14, partial structure of a vehicular seat 70 relating to a third exemplary embodiment of the present invention is illustrated in a schematic front view. This vehicular seat 70 has a basically similar structure to the vehicular seat 10 relating to the first exemplary embodiment. However, in this vehicular seat 70, structure of a headrest frame 72 differs from the headrest frame 32 relating to the first exemplary embodiment.

Similarly to the headrest frame 32 relating to the first exemplary embodiment, this headrest frame 72 is provided with a pair of left and right leg portions 72A and a middle portion 72B. The middle portion 72B is divided in the vicinity of a lateral direction central portion thereof, and a right side portion and left side portion of the middle portion 72B are coupled by a rubber member 74 (resilient body) to be relatively turnable. Thus, a joint portion 72C of the headrest frame 72 is structured. Here, the right side portion of the middle portion 72B is formed integrally with the right side leg portion 72A and the left side portion of the middle portion 72B is formed integrally with the left side leg portion 72A.

In this exemplary embodiment too, inflection operations of the headrest frame 72 may be caused at the joint portion 72C. Therefore, basically the same operational effects as in the first exemplary embodiment are realized. Moreover, similarly to the second exemplary embodiment, the rubber member 74 may be also utilized as an urger. Further, because the joint portion 72C is structured by just the one rubber member 74 on the middle portion 72B, the headrest frame may be given a simple structure.

Fourth Exemplary Embodiment

Figure 15:
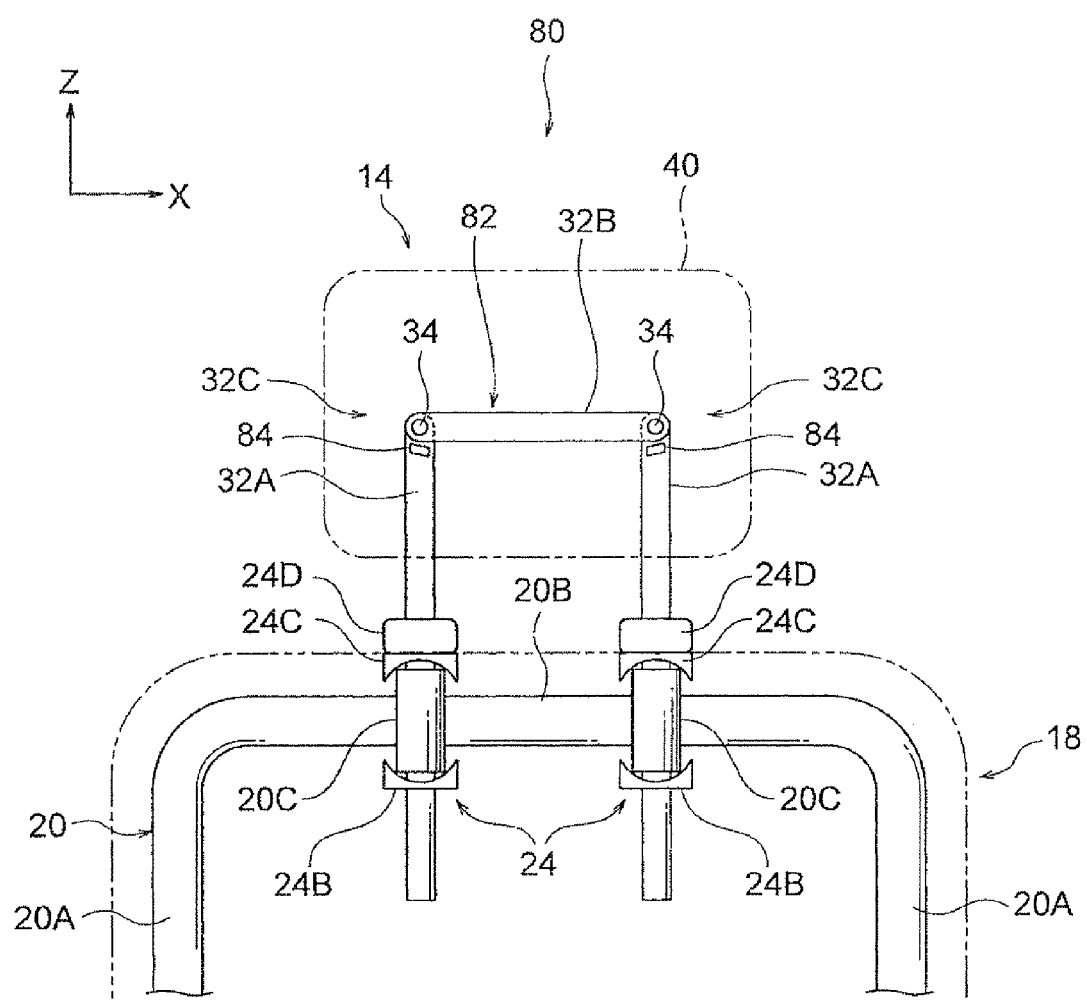
FIG. 15 is a front view illustrating structure of peripheral members including a headrest frame of a vehicular seat relating to a fourth exemplary embodiment of the present invention.

In FIG. 15, partial structure of a vehicular seat 80 relating to a fourth exemplary embodiment of the present invention is illustrated in a schematic front view. This vehicular seat 80 has a basically similar structure to the vehicular seat 10 relating to the first exemplary embodiment. However, in this vehicular seat 80, structure of a headrest frame 82 differs from the headrest frame 32 relating to the first exemplary embodiment.

Figure 16:
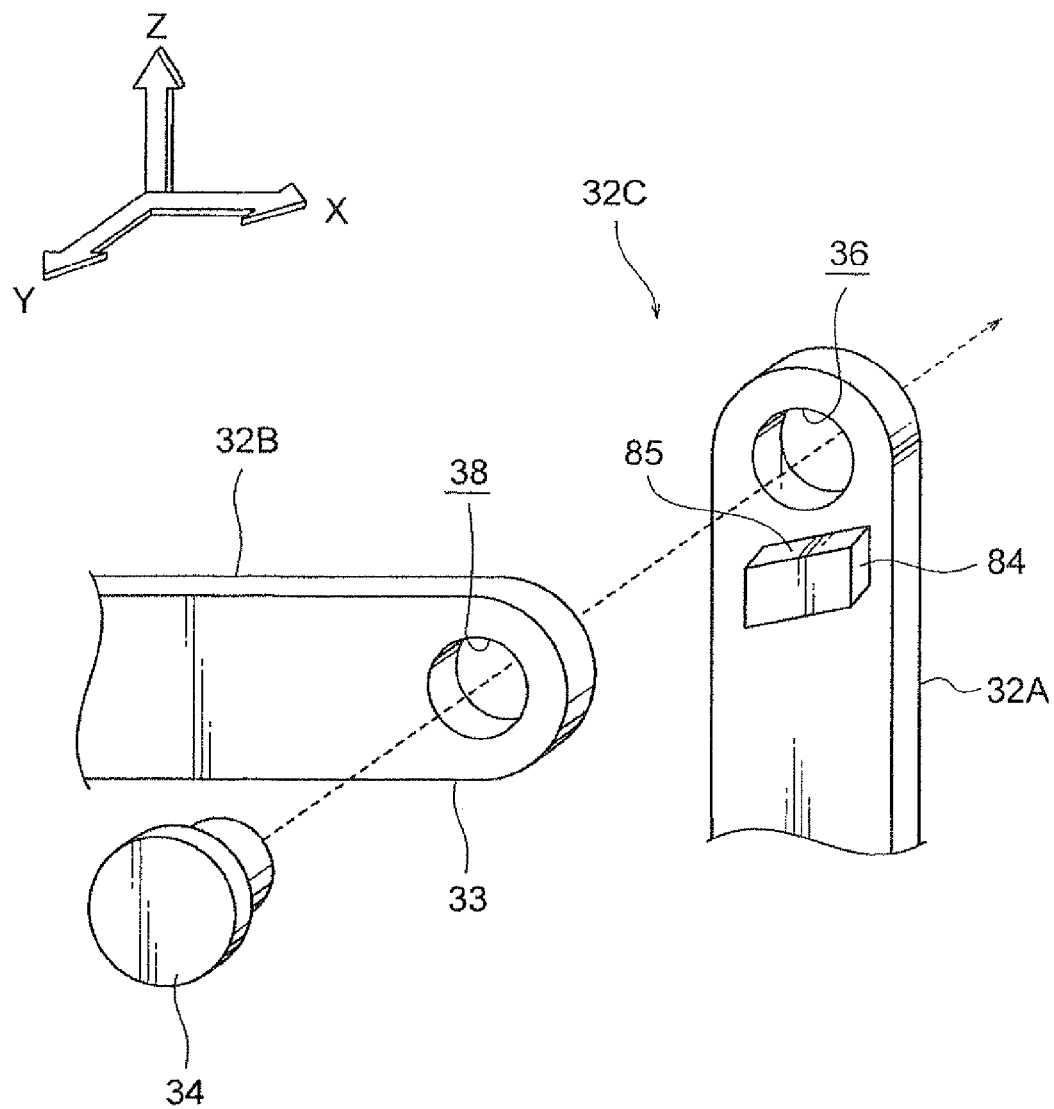
FIG. 16 is an exploded perspective diagram illustrating structure of a joint portion of the headrest frame illustrated in FIG. 15.

This headrest frame 82 has a structure basically similar to the headrest frame 32 relating to the first exemplary embodiment. However, in this headrest frame 82, a stopper 84 is provided at each of the pair of leg portions 32A. These stoppers 84 are formed in block shapes as illustrated in FIG. 16, and are formed integrally with front side faces of the leg portions 32A at vicinities of the joint portions 32C. The upper faces 85 of stoppers 84 facing the lower faces 33 of the lateral direction ends of the middle portion 32B are angled so as to be lower toward the lateral direction central portion of the headrest 14.

Figure 17A:
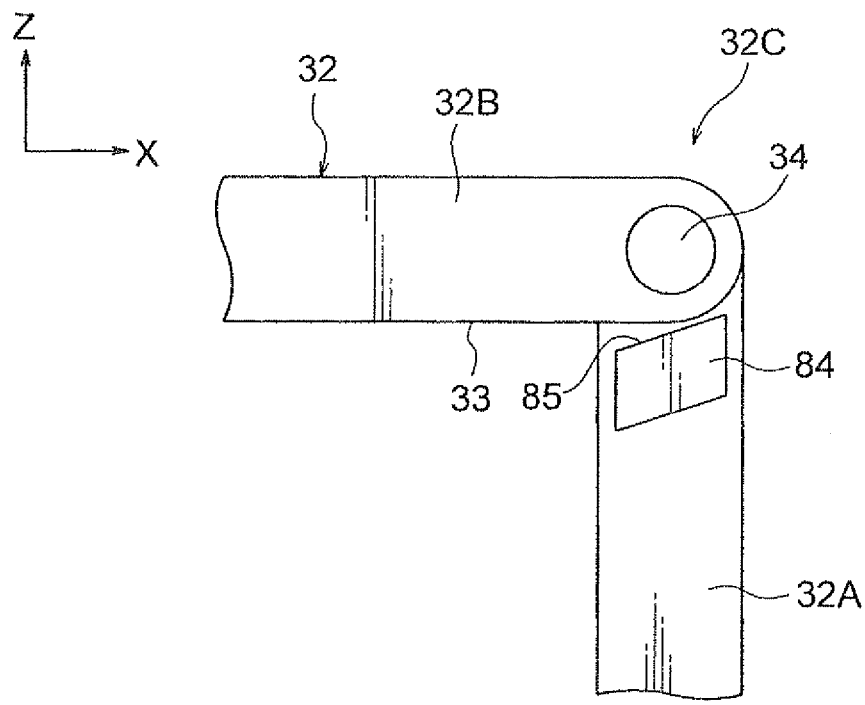
FIG. 17A is a front view illustrating a state of the joint portion illustrated in FIG. 15 at usual times.
Figure 17B:
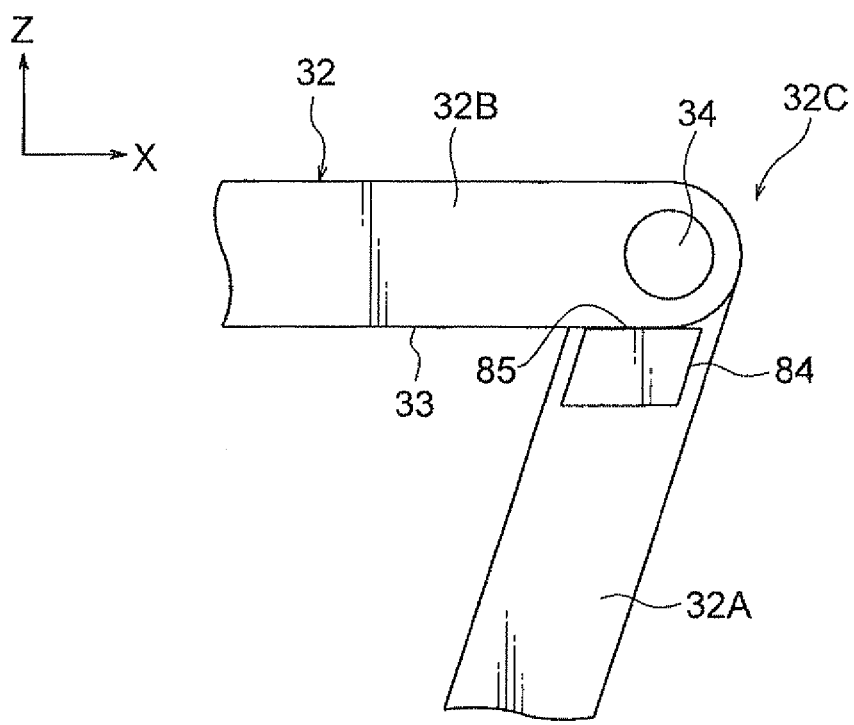
FIG. 17B is a front view illustrating a state in which an inflection operation of the joint portion is limited by a stopper.

In a state in which the headrest frame 82 is retained by the resilient force of the rubber members 30 (see FIG. 3) at the middle position of the range of turning relative to the seatback frame 20 (the state illustrated in FIG. 17A), the upper faces 85 of the stoppers 84 are separated from a lower face 33 of the middle portion 32B. When one of the leg portions 32A and the middle portion 32B are relatively turned in a direction that reduces an angle formed by the two, the upper face 85 abuts against the lower face 33 of the middle portion 32B as illustrated in FIG. 17B. Therefore, turning angles of the headrest frame 82 at the joint portions 32C are limited to within a predetermined range.

In this exemplary embodiment, because the turning angles at the joint portions 32C of the headrest frame 82 are limited to within the predetermined range, large deformations of the headrest frame 82 by external forces may be suppressed, and strength of the headrest frame 82 with respect to vertical direction and lateral direction external forces may be improved. Furthermore, a large displacement of the headrest 14 with respect to the seatback 18 at the time of a vehicle collision or the like may be prevented.

Fifth Exemplary Embodiment

Figure 18:
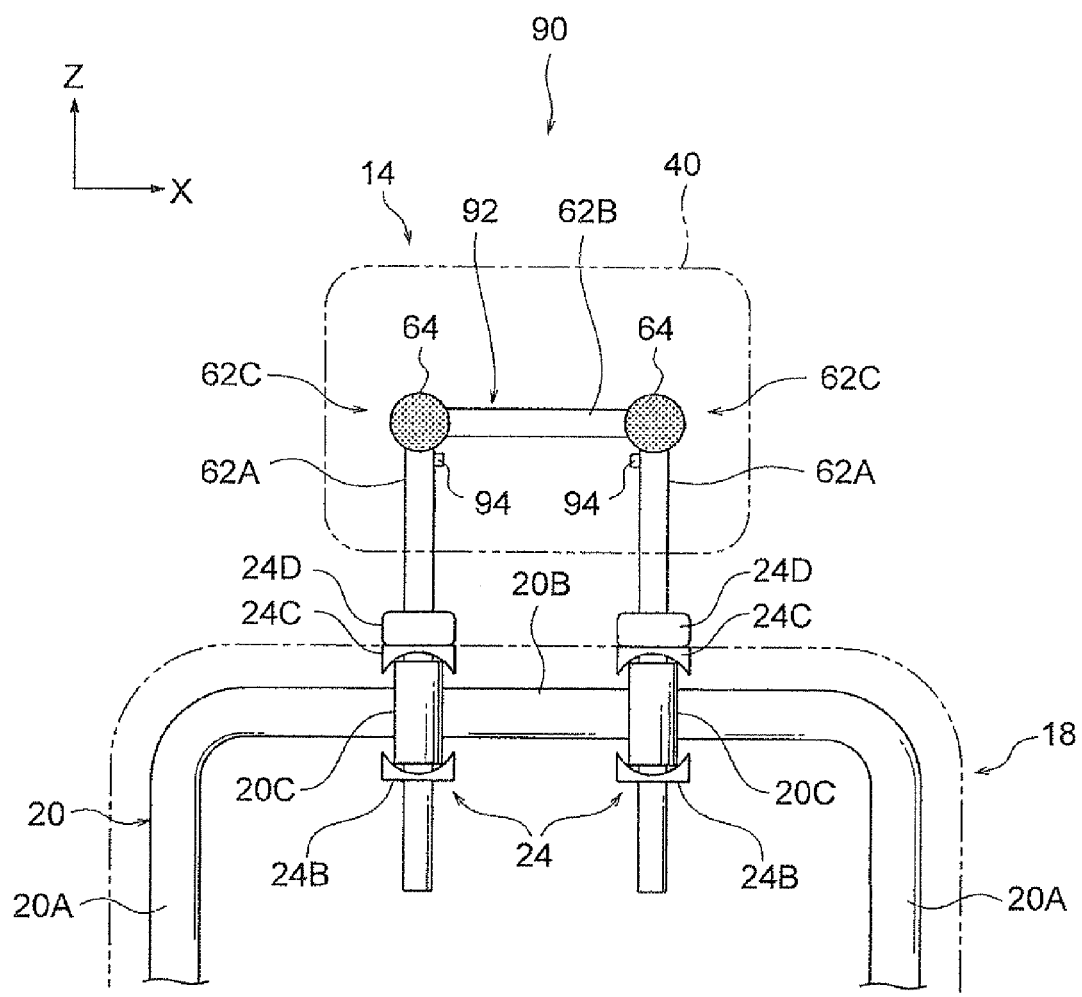
FIG. 18 is a front view illustrating structure of peripheral members including a headrest frame of a vehicular seat relating to a fifth exemplary embodiment of the present invention.

In FIG. 18, partial structure of a vehicular seat 90 relating to a fifth exemplary embodiment of the present invention is illustrated in a schematic front view. This vehicular seat 90 has a basically similar structure to the vehicular seat 60 relating to the second exemplary embodiment. However, in this vehicular seat 90, structure of a headrest frame 92 differs from the headrest frame 62 relating to the second exemplary embodiment.

Figure 19:
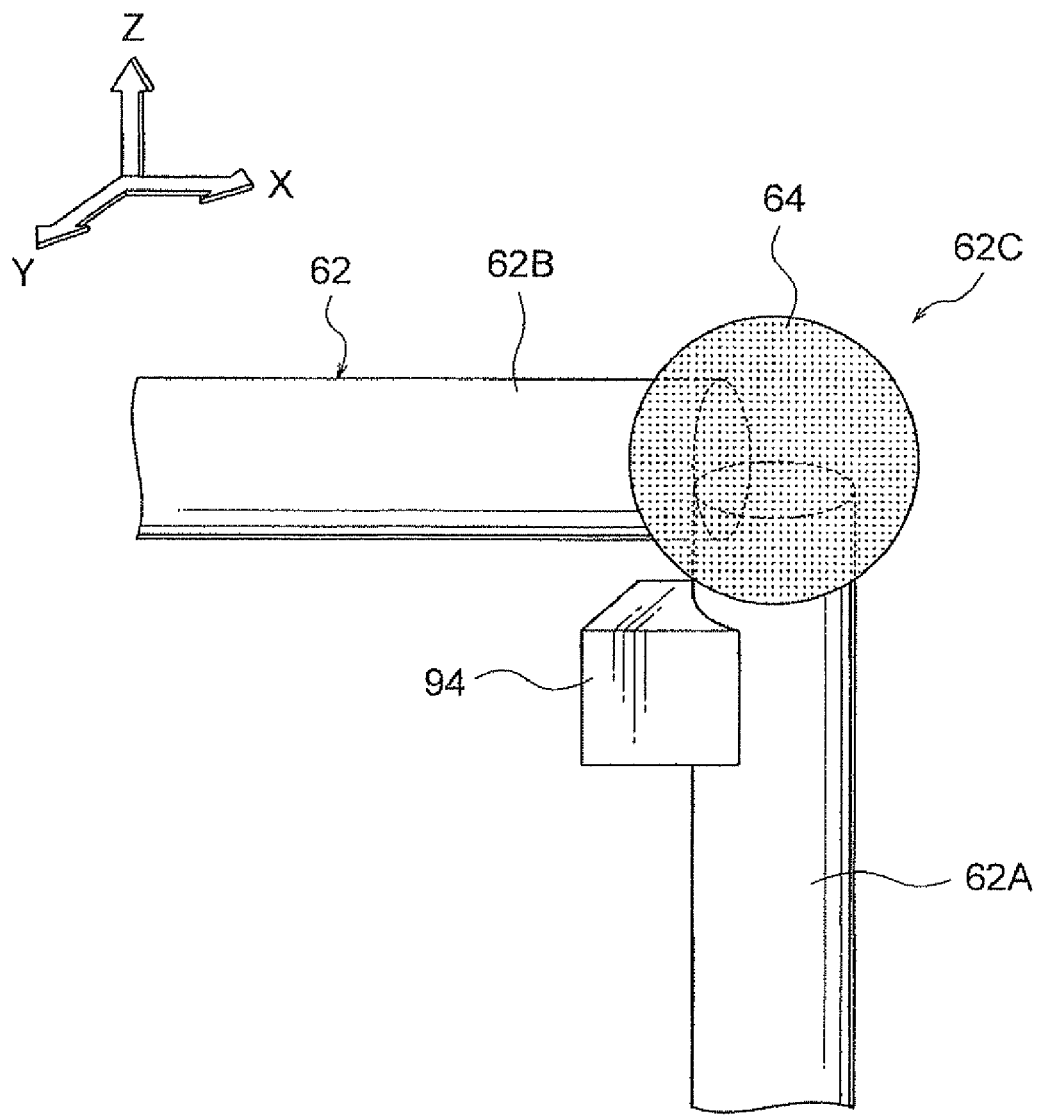
FIG. 19 is a perspective diagram illustrating structure of a joint portion of the headrest frame illustrated in FIG. 18.

This headrest frame 92 has a structure basically similar to the headrest frame 62 relating to the second exemplary embodiment. However, in this headrest frame 92, a stopper 94 is provided at each of the pair of leg portions 62A. These stoppers 94 are formed in block shapes as illustrated in FIG. 19, and are formed integrally with inner side faces of the leg portions 62A (faces towards the lateral direction central portion of the headrest 14) at lower side vicinities of the rubber members 64.

In a state in which the headrest frame 92 is retained by the resilient force of the rubber members 64 at the middle position of the range of turning relative to the seatback frame 20 (the state illustrated in FIG. 18 and FIG. 19), the stoppers 94 are separated from the middle portion 62B. When one of the leg portions 62A and the middle portion 62B are relatively turned in a direction that reduces an angle formed by the two, the stopper 94 abuts against the lower face of the middle portion 62B. Therefore, turning angles of the headrest frame 92 at the joint portions 62C are limited to within a predetermined range.

In this exemplary embodiment, because the turning angles at the joint portions 62C of the headrest frame 92 are limited to within the predetermined range, the same operational effects as in the fourth exemplary embodiment are realized.

Sixth Exemplary Embodiment

In FIG. 20, partial structure of a headrest frame 102 that structures a vehicular seat relating to a sixth exemplary embodiment of the present invention is illustrated in a perspective diagram. Similarly to the headrest frame 32 relating to the first exemplary embodiment, this headrest frame 102 is provided with a pair of left and right leg portions 102A and a middle portion 102B. Upper end portions of the leg portions 102A are inflected in L shapes. Coupling portions 104 that protrude towards the middle portion 102B are formed at upper end portions of the leg portions 102A. The middle portion 102B is formed in a pipe shape, and circular cylinder-shaped rubber members 106 (resilient bodies) are fitted into the inside of axial direction end portions (opening portions) thereof. The coupling portions 104 of the leg portions 102A fit into the insides (tube interiors) of the rubber members 106, and the leg portions 102A and middle portion 10213 are coupled to be relatively turnable via the rubber members 106. Thus, joint portions 102C of the headrest frame 102 are structured.

In this exemplary embodiment too, inflection operations of the headrest frame 102 may be caused at the joint portions 102C. Therefore, basically the same operational effects as in the first exemplary embodiment are realized. Moreover, when large external forces are inputted to the headrest frame 102, the coupling portions 104 (the leg portions 102A) come into contact with the middle portion 102B. Thus, bending angles of the joint portions 32C are limited to within a predetermined range. Therefore, the same operational effects as in the fourth and fifth exemplary embodiments are realized.

Seventh Exemplary Embodiment

Figure 21:
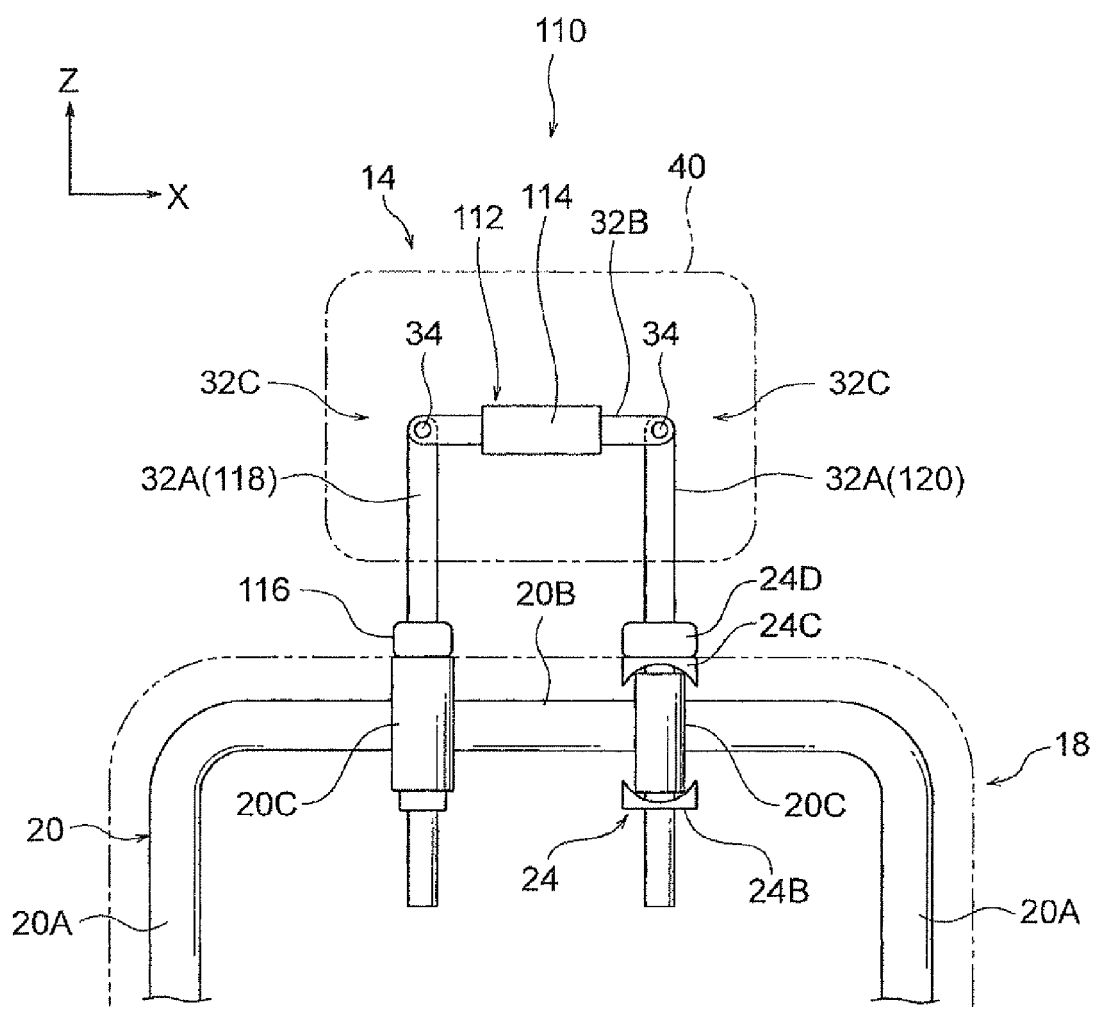
FIG. 21 is a front view illustrating structure of peripheral members including a headrest frame of a vehicular seat relating to a seventh exemplary embodiment of the present invention.

In FIG. 21, partial structure of a vehicular seat 110 relating to a seventh exemplary embodiment of the present invention is illustrated in a schematic front view. This vehicular seat 110 has a basically similar structure to the vehicular seat 10 relating to the first exemplary embodiment. However, in this vehicular seat 110, structure of a headrest frame 112 differs from the headrest frame 32 relating to the first exemplary embodiment.

This headrest frame 112 has a structure basically similar to the headrest frame 32 relating to the first exemplary embodiment. However, a central portion of the middle portion 32B is structured by an absorber 114, and the middle portion 32B is made extensible/compressible in a length direction thereof. This absorber 114 is, for example, an oil-type absorber. Damping force is generated at times of extension and compression of the middle portion 32B.

In this exemplary embodiment, one headrest support 116 is attached to the support brackets 20C (the seatback frame 20) to be relatively non-movable, and the other headrest support 24 is attached to the support brackets 20C to be relatively turnable about the axis in the longitudinal direction of the seatback 18. In the following descriptions, the leg portion 32A that is coupled to the one headrest support 116 is referred to as a fixed leg portion 118, and the leg portion 32A that is coupled to the above-mentioned other headrest support 24 is referred to as a movable leg portion 120. The main body portion 40 of the headrest 14 is attached to this movable leg portion 120.

In this exemplary embodiment, when a lateral direction vibration is applied to the vehicular seat 110 and a lateral direction inertia force acts on the headrest 14, the movable leg portion 120 (the headrest support 24) causes the rubber members 30 (see FIG. 3) to resiliently deform and turns to left or right with respect to the seatback frame 20. Along with the movable leg portion 120, the main body portion 40 of the headrest 14 turns to left or right with respect to the seatback 18 (a pendulum movement). Thus, the headrest 14 functions as a dynamic damper, and the same operational effects as in the first exemplary embodiment are realized.

Figure 22:
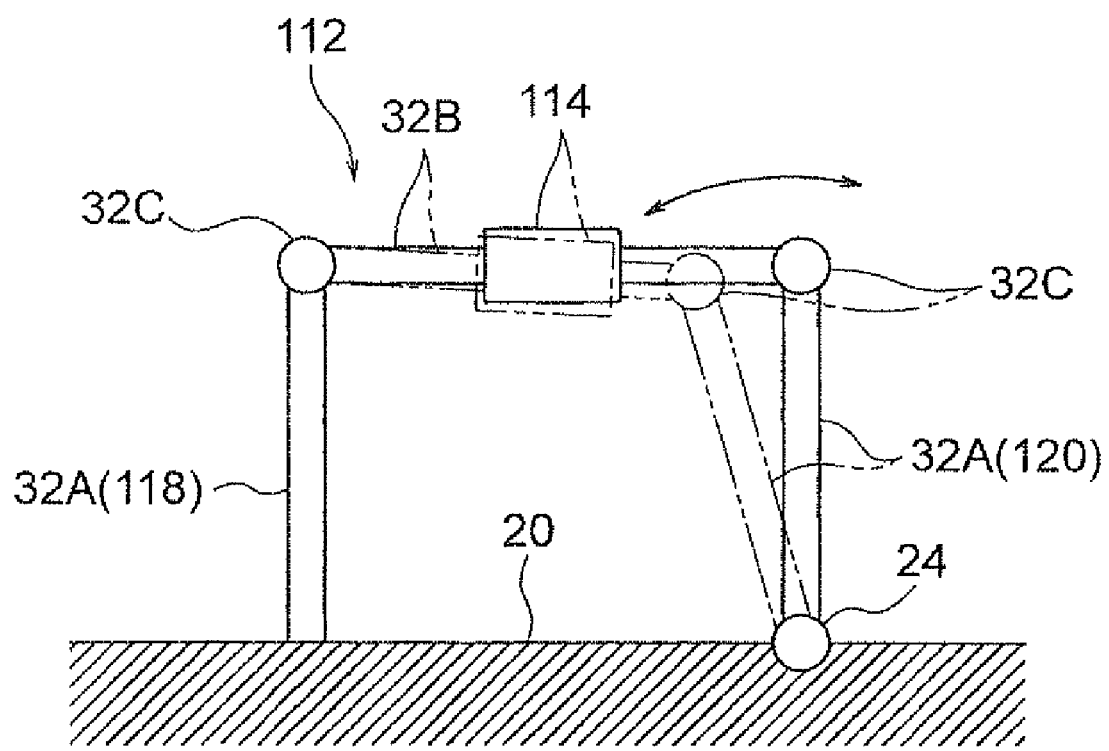
FIG. 22 is a conceptual diagram of the headrest frame illustrated in FIG. 21.

Furthermore, in this exemplary embodiment, when the movable leg portion 120 is turning to left and right, the movable leg portion 120 moves toward and away from the fixed leg portion 118 as illustrated in FIG. 22, and the middle portion 32B extends and compresses. Thus, damping force of the absorber 114 is provided to the turning of the movable leg portion 120, which is to say the turning of the headrest 14 with respect to the seatback 18. Therefore, vibrations of the seat main body 12 are effectively mitigated by this damping force.

Figure 23:
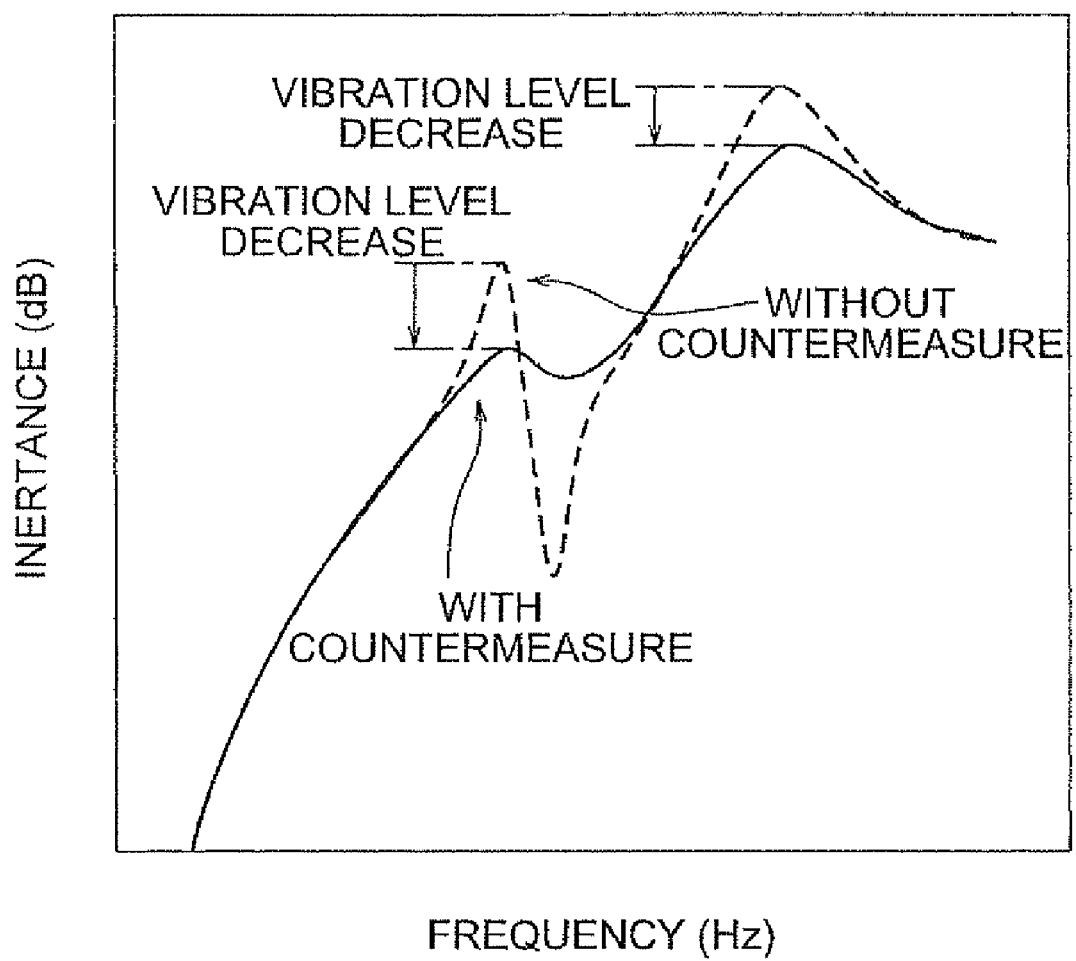
FIG. 23 is a graph illustrating results of a simulation of lateral direction vibration levels in vehicular seats.

In FIG. 23, results of a simulation of lateral direction vibration levels of vehicular seats (relationships between frequency and inertance) are illustrated in a graph. In FIG. 23, the dotted line shows vibration levels of an ordinary vehicular seat in which a vibration countermeasure is not employed (see FIG. 7). Also in FIG. 23, the solid line shows vibration levels of the vehicular seat 110 in which the vibration countermeasure according to the present seventh exemplary embodiment is employed. From FIG. 23, it is seen that a vibration mitigation effect is larger in the present vehicular seat 110 than in the vehicular seat in which the vibration countermeasure is not employed.

The above-described seventh exemplary embodiment has a structure in which the absorber 114 (vibration damping apparatus) is provided on the middle portion 32B of the headrest frame 112. However, the present invention is not to be limited thus. Structures are possible in which the absorber 114 is provided at the fixed leg portion 118 or the movable leg portion 120.

Eighth Exemplary Embodiment

Figure 24A:
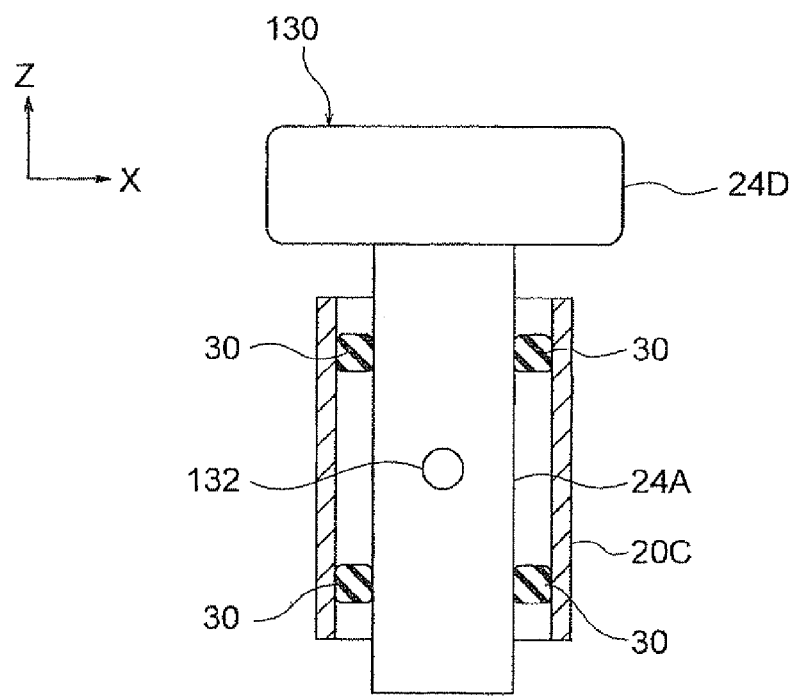
FIG. 24A is a partial sectional diagram illustrating structure of a headrest support and a support bracket of a vehicular seat relating to an eighth exemplary embodiment of the present invention.
Figure 24B:
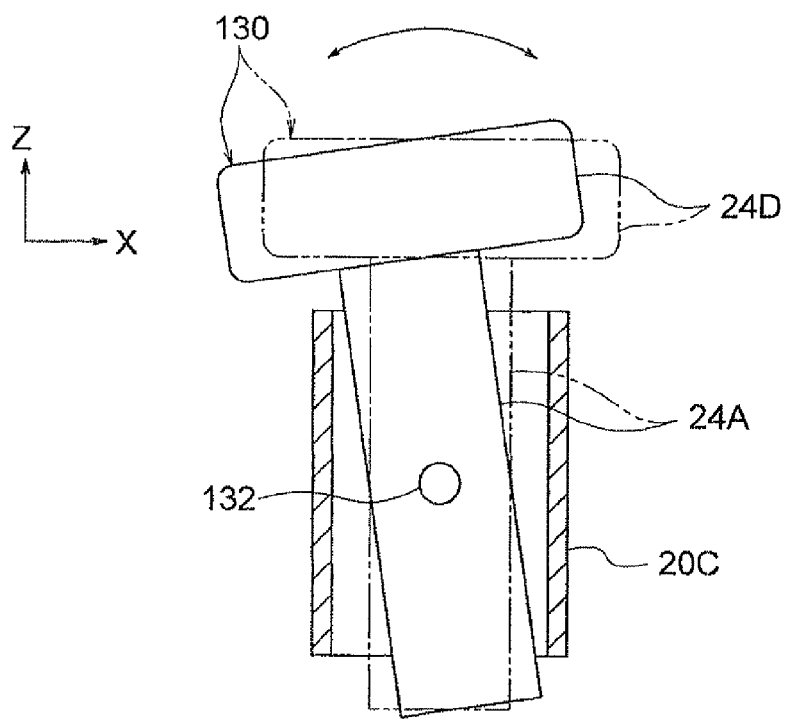
FIG. 24B is a partial sectional diagram illustrating a state in which the headrest support illustrated in FIG. 24A is relatively turned with respect to the support bracket.

In FIG. 24A and FIG. 2413, partial structure of a vehicular seat relating to an eighth exemplary embodiment of the present invention is illustrated in schematic partial sectional diagrams. In FIG. 24B, for convenience of description, the rubber members 30 are not illustrated. This exemplary embodiment has a basically similar structure to the first exemplary embodiment. However, in this exemplary embodiment, the structure of a headrest support 130 differs from the headrest support 24 relating to the first exemplary embodiment.

Similarly to the headrest support 24 relating to the first exemplary embodiment, the headrest support 130 is provided with the main body portion 24A and the locking portion 24D. However, the lower guide portion 24B and the upper guide portion 24C are omitted. In place thereof, support shafts 132 are provided at the main body portion 24A of the headrest support 130, at the front side face and rear side face thereof respectively. These support shafts 132 are disposed in states in which axial directions thereof are along the longitudinal direction of the seatback 18 (a direction perpendicular to the paper of the drawing in FIG. 24). These support shafts 132 are axially supported to be turnable at bearing holes (not shown) formed in the support bracket 20C. Thus, the headrest support 130 is supported to be relatively turnable about the axis along the longitudinal direction of the seatback 18 with respect to the support brackets 20C (the seatback frame 20). In this exemplary embodiment too, basically the same operational effects as in the first exemplary embodiment are realized.

Ninth Exemplary Embodiment

Figure 25A:
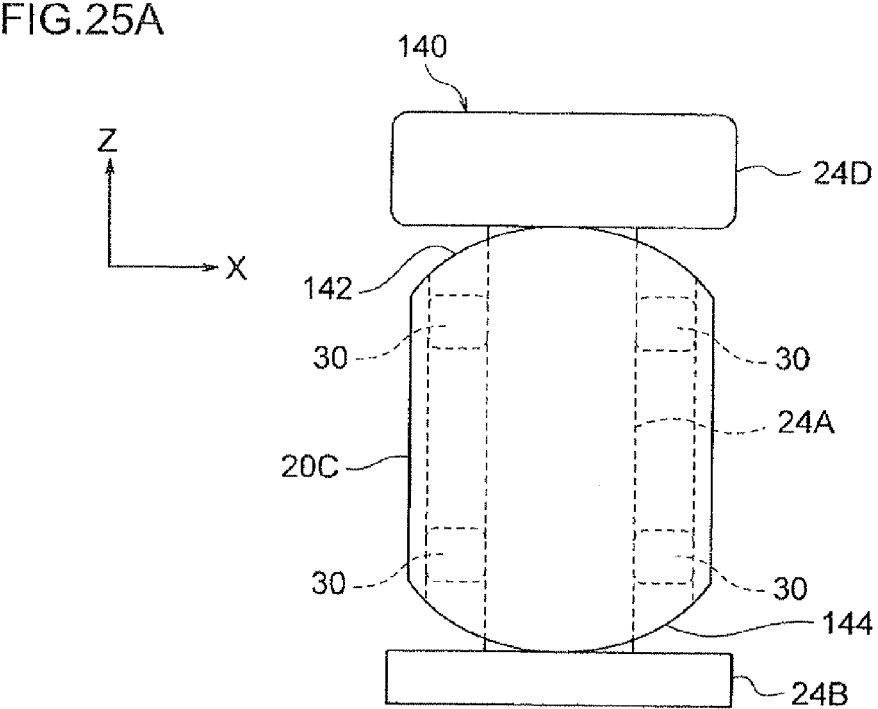
FIG. 25A is a front view illustrating structure of a headrest support and a support bracket of a vehicular seat relating to a ninth exemplary embodiment of the present invention.
Figure 25B:
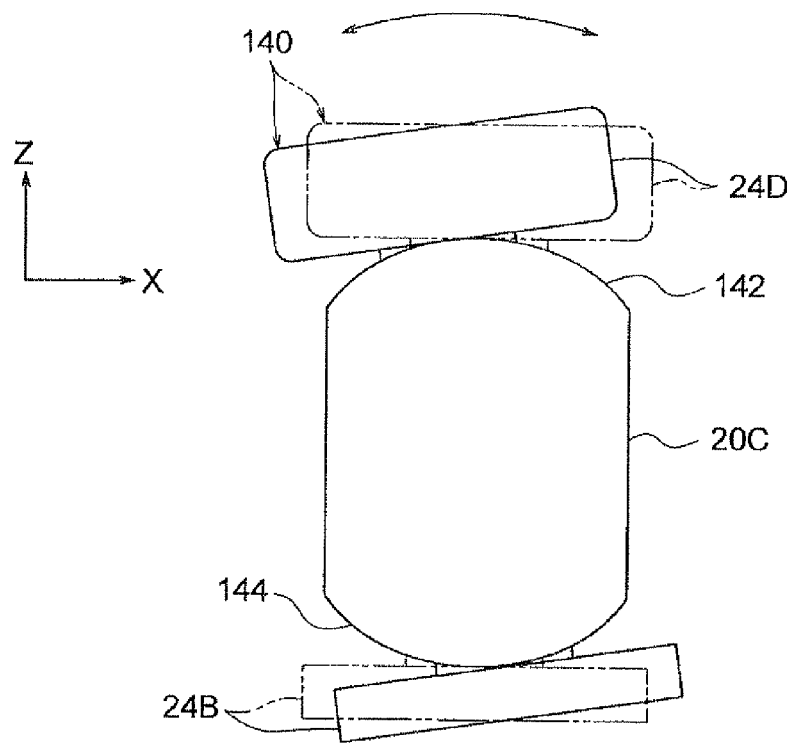
FIG. 25B is a partial sectional diagram illustrating a state in which the headrest support illustrated in FIG. 25A is relatively turned with respect to the support bracket.

In FIG. 25A and FIG. 25B, partial structure of a vehicular seat relating to a ninth exemplary embodiment of the present invention is illustrated in schematic partial sectional diagrams. This exemplary embodiment has a basically similar structure to the first exemplary embodiment. However, in this exemplary embodiment, the structure of a headrest support 140 differs from the headrest support 24 relating to the first exemplary embodiment.

Similarly to the headrest support 24 relating to the first exemplary embodiment, the headrest support 140 is provided with the main body portion 24A, the lower guide portion 24B and the locking portion 24D. However, the upper guide portion 24C is omitted. At the lower guide portion 24B, the circular cylinder surface 26 is omitted and the upper face is formed to be flat.

In this exemplary embodiment, an upper end edge of the support bracket 20C serves as an upper circular arc portion 142 that is formed in a circular arc shape as viewed in the longitudinal direction of the seatback 18 (the direction perpendicular to the surface of the drawing in FIG. 25), and a lower end edge of the support bracket 20C serves as a lower circular arc portion 144 that is formed in a circular arc shape that is concentric with the upper circular arc portion 142. The upper circular arc portion 142 and the lower circular arc portion 144 are formed in circular arc shapes that are centered on the axis along the longitudinal direction of the seatback 18. The upper circular arc portion 142 abuts against the lower face of the locking portion 24D, and the lower circular arc portion 144 abuts against the upper face of the lower guide portion 2413. Thus, the headrest support 140 is supported to be relatively non-movable in the vertical direction with respect to the support bracket 20C (the seatback frame 20). In addition, the headrest support 140 is made relatively turnable with respect to the support bracket 20C (the seatback frame 20) about the axis along the longitudinal direction of the seatback 18 (see FIG. 2513), by the lower face of the locking portion 24D sliding against the upper circular arc portion 142 of the support bracket 20C and the upper face of the lower guide portion 24B sliding against the lower circular arc portion 144 of the support bracket 20C. In this exemplary embodiment too, basically the same operational effects as in the first exemplary embodiment are realized.

Tenth Exemplary Embodiment

Figure 26A:
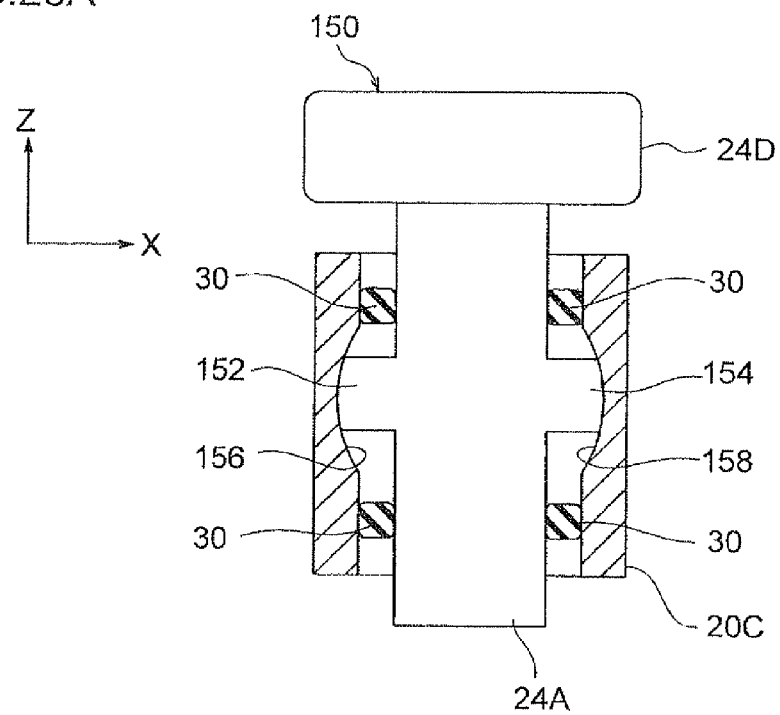
FIG. 26A is a partial sectional diagram illustrating structure of a headrest support and a support bracket of a vehicular seat relating to a tenth exemplary embodiment of the present invention.
Figure 26B:
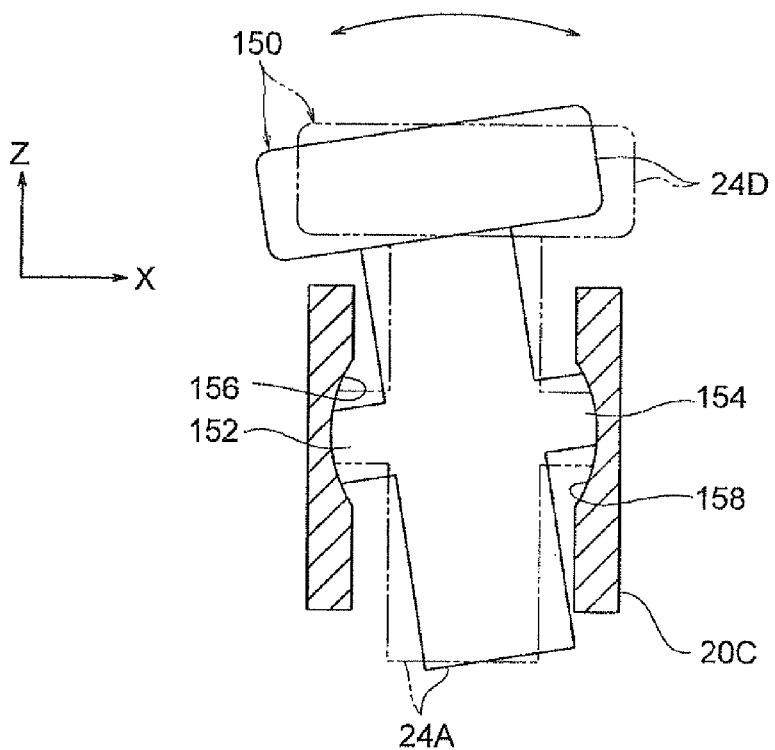
FIG. 26B is a partial sectional diagram illustrating a state in which the headrest support illustrated in FIG. 26A is relatively turned with respect to the support bracket.

In FIG. 26A and FIG. 26B, partial structure of a vehicular seat relating to this tenth exemplary embodiment is illustrated in schematic partial sectional diagrams. This exemplary embodiment has a basically similar structure to the first exemplary embodiment. However, in this exemplary embodiment, the structure of a headrest support 150 differs from the headrest support 24 relating to the first exemplary embodiment.

Similarly to the headrest support 24 relating to the first exemplary embodiment, the headrest support 150 is provided with the main body portion 24A and the locking portion 24D. However, the lower guide portion 2413 and the upper guide portion 24C are omitted. In place thereof, a right guide protrusion 152 and a left guide protrusion 154 are provided at the main body portion 24A of the headrest support 130. The right guide protrusion 152 protrudes from the right side face thereof and the left guide protrusion 154 protrudes from the left side face.

In this exemplary embodiment, a right cylinder surface 156 is formed at an inner periphery face at the right side of the support bracket 20C, and a left cylinder surface 158 is formed at an inner periphery face at the left side of the support bracket 20C. The right cylinder surface 156 and the left cylinder surface 158 are formed in concentric circular arc shapes centered on the longitudinal direction axis of the seatback 18 (the direction orthogonal to the surface of the paper in FIG. 26). A distal end of the right guide protrusion 152 of the headrest support 150 abuts against the right cylinder surface 156, and a distal end of the left guide protrusion 154 abuts against the left cylinder surface 158. Thus, the headrest support 150 is supported to be relatively non-movable in the vertical direction with respect to the support bracket 20C (the seatback frame 20) and relatively turnable about the axis along the longitudinal direction of the seatback 18 (see FIG. 26B). In this exemplary embodiment too, basically the same operational effects as in the first exemplary embodiment are realized.

In the exemplary embodiments described hereabove, the joint portions 32C, 62C, 72C, and 102C are provided at the headrest frames 32, 62, 72, 82, 92, 102 and 112. Thus, the respective headrest frames are formed in structures that are inflectingly operable (deformable). However, the present invention is not to be limited thus. For example, a structure may be formed in which the headrest frame is made deformable by providing a bendable portion (deformer) that easily bends and deforms at the headrest frame, and thus the headrest frame is turned to left and right with respect to the seatback frame. Further, the headrest frame may be made deformable by, for example, forming the whole or a portion of the headrest frame of a spring material.

Hereabove, the present invention has been described by presenting exemplary embodiments. However, the above exemplary embodiments are examples, and numerous modifications may be applied within a scope not departing from the spirit of the invention. It will be clear that the scope of rights to the present invention is not to be limited to the above exemplary embodiments.

EXPLANATION OF REFERENCE NUMERALS

10 Vehicular seat
14 headrest
18 Seatback
20 Seatback frame
30 Rubber members (urger)
32 headrest frame
32A Leg portions
32B Middle portion
32C Joint portions
34 Pins (rods, coupling members)
60 Vehicular seat
62 headrest frame
62A Leg portions
62B Middle portion
62C Joint portions
64 Rubber members (resilient bodies)
70 Vehicular seat
72 headrest frame
72A Leg portions
72B Middle portion
72C Joint portions
74 Rubber member (resilient body)

80 Vehicular seat
82 headrest frame
90 Vehicular seat
92 headrest frame
102 headrest frame
110 Vehicular seat
112 headrest frame
114 Absorber (vibration damping apparatus)

The invention claimed is:

1. A vehicular seat comprising:
a headrest in which one joint portion is or a plurality of joint portions are provided at a headrest frame, the headrest frame including a pair of left and right leg portions and a middle portion joining the pair of leg portions, and that is made turnable to left and right with respect to a seatback by the pair of leg portions being coupled to a seatback frame in a state in which the headrest frame is inflectingly operable at the joint portion; and
an urger that is resiliently deformable and urges the headrest to a middle portion of a range of turning with respect to the seatback due to a resilient force thereof.

2. The vehicular seat according to claim 1, wherein, in the headrest frame, a bending angle at the joint portion is limited to within a predetermined range by one side portion and another side portion between which the joint portion is interposed coming into contact with one another.

3. The vehicular seat according to claim 1, wherein the headrest frame includes a vibration damping apparatus that extends and compresses in association with inflection operations of the joint portion, and the vibration damping apparatus provides damping force to the inflection operations.

4. The vehicular seat according to claim 3, wherein, in the headrest frame, the pair of leg portions and the middle portion are divided and are coupled by a coupling member that constitutes the joint portion, the middle portion is provided with a vibration damping apparatus and is made extensible and compressible, one of the leg portions is coupled to the seatback frame to be relatively turnable about a longitudinal direction axis of the seatback, and the other of the leg portions is coupled to the seatback frame to be relatively non-movable.

5. The vehicular seat according to claim 1, wherein in the headrest frame, the pair of leg portions are coupled to the seatback frame to be relatively turnable about a longitudinal direction axis of the seatback.

6. The vehicular seat according to claim 5, wherein, in the headrest frame, the pair of leg portions and the middle portion are divided and are coupled by a coupling member that constitutes the joint portion.

7. The vehicular seat according to claim 6, wherein the coupling member is a rod whose axial direction is along the longitudinal direction of the seatback.

8. The vehicular seat according to claim 6, wherein the coupling member is a resilient body.

9. The vehicular seat according to claim 5, wherein, in the headrest frame, the middle portion is divided between left and right and is coupled by a coupling member that constitutes the joint portion.

10. A vehicular seat comprising:
a headrest that includes a headrest frame that is made deformable by provision of one joint portion or a plurality of joint portions, and that is made turnable to left and right with respect to a seatback by the headrest frame being coupled to a seatback frame in a deformable state; and
an urger that is resiliently deformable and urges the headrest to a middle portion of a range of turning with respect to the seatback due to a resilient force thereof.

11. A vehicular seat comprising:
a headrest that includes a headrest frame in which a deformer for deforming the headrest is provided, and that is made turnable to left and right with respect to a seatback by the headrest frame being coupled to a seatback frame in a deformable state; and
an urger that urges the headrest to a middle portion of a range of turning with respect to the seatback.

* * * * *